(12) United States Patent
Hirata et al.

(10) Patent No.: US 7,466,335 B2
(45) Date of Patent: Dec. 16, 2008

(54) CONFERENCE RECORDING DEVICE, CONFERENCE RECORDING METHOD, AND DESIGN METHOD AND STORAGE MEDIA STORING PROGRAMS

(75) Inventors: Kazutaka Hirata, Kanagawa (JP); Jun Miyazaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 824 days.

(21) Appl. No.: 10/987,002

(22) Filed: Nov. 15, 2004

(65) Prior Publication Data

US 2005/0248651 A1    Nov. 10, 2005

(30) Foreign Application Priority Data

May 10, 2004  (JP) .............................. 2004-139441

(51) Int. Cl.
*H04N 7/14* (2006.01)
*H04L 12/16* (2006.01)
(52) U.S. Cl. ............... 348/14.08; 348/14.01; 348/14.09
(58) Field of Classification Search ... 348/14.01–14.09, 348/14.1, 14.11–14.16; 386/46, 117, 52; 362/260, 233; 315/312; 715/717
See application file for complete search history.

(56) References Cited

U.S. PATENT DOCUMENTS

| 6,761,470 B2* | 7/2004 | Sid ............................. 362/233 |
| 6,934,461 B1* | 8/2005 | Strub et al. ................... 386/46 |
| 2002/0052755 A1* | 5/2002 | Whatley et al. ............... 705/1 |
| 2003/0103075 A1* | 6/2003 | Rosselot ..................... 345/717 |

FOREIGN PATENT DOCUMENTS

| JP | 09200350 A | * | 7/1997 |
| JP | 10-145763 A | | 5/1998 |
| JP | 2002-171499 A | | 6/2002 |

* cited by examiner

*Primary Examiner*—Melur Ramakrishnaiah
(74) *Attorney, Agent, or Firm*—Sughrue Mion, PLLC

(57) ABSTRACT

A conference recording device includes plural photographing units, a generating unit that generates photographing area information representative of a photographing area of each of the photographing units so that each of the photographing units cooperatively photographs a photographing object, and a control unit that controls the photographing area of each of the photographing units by based on the photographing area information generated by the generating unit.

39 Claims, 26 Drawing Sheets

PARAMETERS REPRESENTATIVE OF
PHOTOGRAPHING AREA INFORMATION

FIG. 6

47 PHOTOGRAPHING AREA INFORMATION TABLE

| 47a PHOTOGRAPHING DEVICE IDENTIFIER | 47b COORDINATES | 47c ANGLE FORMED WITH NORMAL | 47d AZIMUTH | 47e SOLID ANGLE | 47f DISTANCE | 47g CAMERA SPECIFICATION | 47h TIME |
|---|---|---|---|---|---|---|---|
| CAM 0 | (0, 0, 0) | 45 | 10 | 1 | 1 | CAMERA A CAPABLE OF PANNING, TILTING, AND ZOOMING | 1 |
| CAM 1 | (0, 1, 0) | 60 | 2 | 2 | 2 | CAMERA B CAPABLE OF PANNING, TILTING, AND ZOOMING | 2 |
| CAM 2 | (1, 1, 0) | 70 | 3 | 3 | 2 | CAMERA C CAPABLE OF PANNING, TILTING, AND ZOOMING | 3 |

FIG. 7

| LIGHTING DEVICE IDENTIFIER | COORDINATES | ANGLE FORMED WITH NORMAL | AZIMUTH | SOLID ANGLE | DISTANCE | LIGHT SPECIFICATION | TIME |
|---|---|---|---|---|---|---|---|
| LIGHT 0 | (0, 0, 1) | 45 | 11 | 1 | 1 | LIGHTING A | 4 |
| LIGHT 1 | (0, 1, 1) | 60 | 3 | 2 | 2 | LIGHTING B | 5 |

48a, 48b, 48c, 48d, 48e, 48f, 48g, 48h

48 LIGHTING AREA INFORMATION TABLE

FIG. 8

| 49a | 49b | 49c | 49d | 49e | 49f | 49g | 49h |
|---|---|---|---|---|---|---|---|
| SOUND RECORDING DEVICE IDENTIFIER | COORDINATES | ANGLE FORMED WITH NORMAL | AZIMUTH | SOLID ANGLE | SOLID DISTANCE | MICROPHONE SPECIFICATION | TIME |
| MIC 0 | (0, 0, 0) | 45 | 11 | 1 | 1 | MICROPHONE A | 6 |
| MIC 1 | (0, 0, 1) | 60 | 3 | 2 | 2 | MICROPHONE B | 7 |

49 SOUND RECORDING AREA INFORMATION TABLE

CONFERENCE RECORDING DEVICE, CONFERENCE RECORDING METHOD, AND DESIGN METHOD AND STORAGE MEDIA STORING PROGRAMS

BACKGROUND OF THE INVENTION

1. Field of the Invention

The present invention relates to a conference recording device, a conference recording method, and a design method and program.

2. Description of the Related Art

Conventionally, in conference recording in which conferences such as video conferences are photographed by video tape recorders and the photographed conference videos are used, cameras have been controlled by estimating the positions of conference participants and sound source positions as one method in order to keep the quality of the photographed conference videos satisfactory. Specifically, conventional technologies as described below are available on the devices and methods of controlling cameras, or the designing of furniture and rooms used in conferences.

In a device described in Japanese Published Unexamined Patent Application No. Hei 10-145763, phases of voice signals inputted to individual microphones of a microphone array are shifted and synthesized to identify speakers so that cameras and microphones are controlled in a conference in which an indefinite number of people participate.

A device described in Japanese Published Unexamined Patent Application No. 2002-171499 has a storage device in which angle control information on plural camera angles is stored in association with plural microphones. The device controls camera angles, based on angle control information associated with microphones used.

The device described in Japanese Published Unexamined Patent Application No. Hei 10-145763 controls cameras and the like, in a video conference, by estimating sound sources and the positions of participants from voice data and the like. However, when plural cameras and plural lightings are used to photograph the conference, redundancy occurs in photographing conditions and lighting conditions, so that less redundant conference information cannot be acquired.

The device described in Japanese Published Unexamined Patent Application No. 2002-171499 can control camera angles for microphones used. However, since the environment of a conference room changes, the fixed control by association with the microphones causes redundancy in photographing conditions, so that less redundant conference information cannot be acquired.

SUMMARY OF THE INVENTION

The present invention has been made in view of the above-mentioned problems and provides a conference recording device, a conference recording method, a design method or program that can capture less redundant conference information.

To address the abovementioned problem, an embodiment of the present invention is a conference recording device including: plural photographing units; a generating unit that generates photographing area information representative of a photographing area of each of the photographing units so that each of the photographing units cooperatively photographs a photographing object; and a control unit that controls the photographing area of each of the photographing units by use of the photographing area information generated by the generating unit. The photographing unit photographs a picture and/or records a video of the photographing object. Therefore, the photographing object is not limited to a still image and may include a moving image. According to this embodiment of the invention, the conference recording device generates photographing area information representative of a photographing area of each photographing unit so that each photographing unit cooperatively photographs a photographing object, and the photographing area of each of the photographing units is controlled using the photographing area information. Therefore, plural less redundant videos can be obtained.

BRIEF DESCRIPTION OF THE DRAWINGS

Embodiments of the present invention will be described in detail based on the following figures, wherein:

FIG. 6 is a drawing showing a photographing area information table 47 representative of photographing area information held in a photographing area information storage part 12;

FIG. 7 is a drawing showing a lighting area information table 48 representative of lighting area information held in a lighting area information storage part 28;

FIG. 8 is a drawing showing a sound recording area information table 49 representative of sound recording area information held in a sound recording area information storage part 41;

DETAILED DESCRIPTION OF THE INVENTION

Hereinafter, embodiments of the present invention will be described using examples.

First Embodiment

Figure 1:
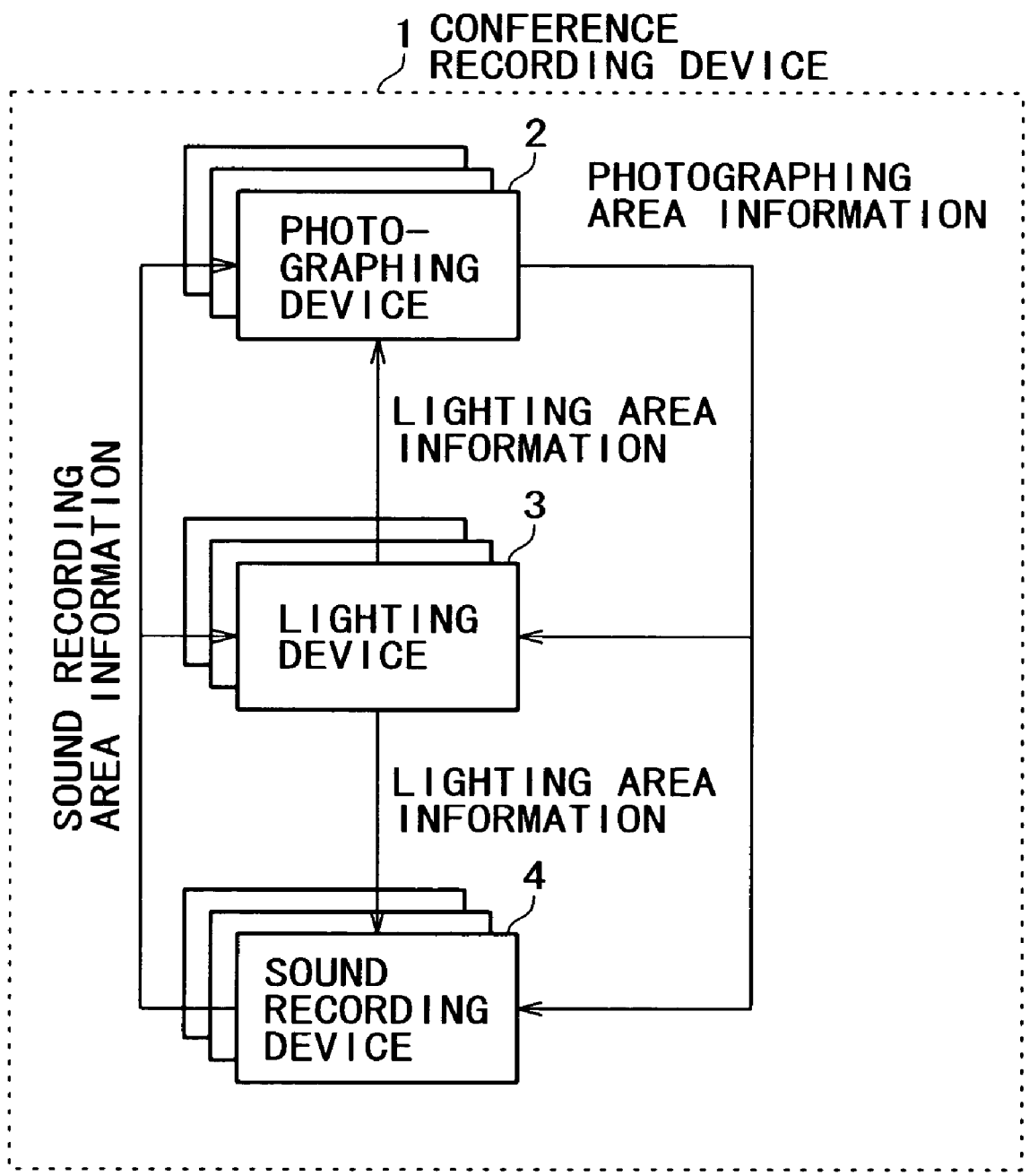
FIG. 1 is a block diagram of a system according to a first embodiment.

FIG. 1 is a block diagram showing an example of the construction of a conference recording device according to a first embodiment. As shown in FIG. 1, a conference recording device 1 includes photographing devices 2, lighting devices 3, and sound recording devices 4. The photographing devices 2, the lighting devices 3, and the sound recording devices 4 are provided in plural numbers.

The photographing devices 2 refer to photographing area information of each photographing device, lighting area information of each lighting device, and sound area information of each sound recording device, generates photographing area information representative of a photographing area of each photographing device so that each photographing device cooperatively photographs an photographing object, and controls the photographing area by use of the photographing area information. The lighting devices 3 refer to photographing area information of each photographing device, lighting area information of each lighting device, and sound area information of each sound recording device, generates lighting area information representative of a lighting area of each lighting device so that each lighting device cooperatively lights an photographing object, and controls the lighting area by use of the lighting area information. The sound recording devices 4 refer to photographing area information of each photographing device, sound recording area information of each sound recording device, and sound area information of each sound recording device, generates sound recording area information representative of a sound recording area of each sound recording device so that each sound recording device cooperatively records sound information, and controls the sound recording area by use of the sound recording area information. This enables spatial or time-based exclusive control. The following describes the photographing devices 2, the lighting devices 3, and the sound recording devices 4.

Figure 2:
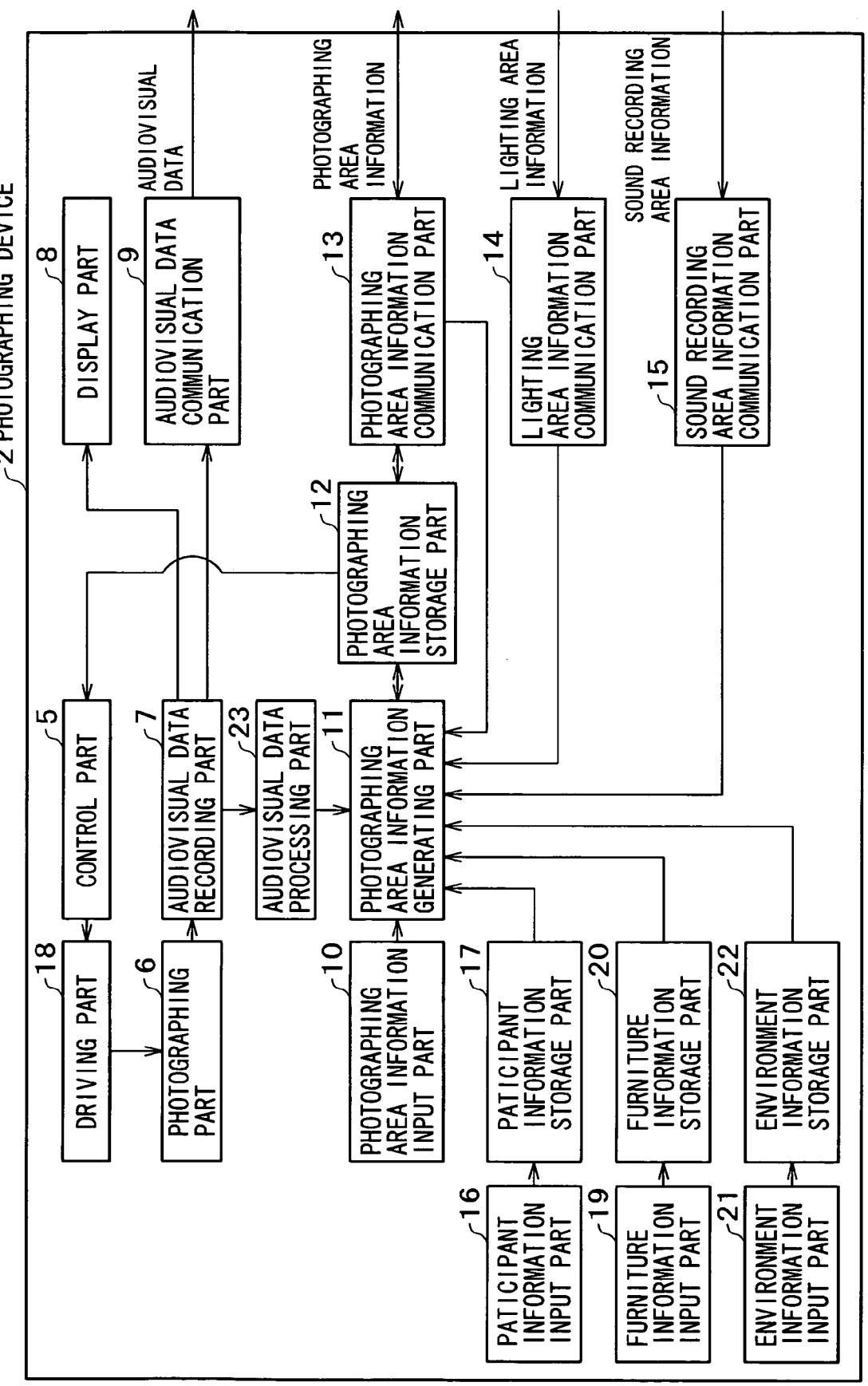
FIG. 2 is a block diagram showing an example of the construction of photographing devices 2.

FIG. 2 is a block diagram showing an example of the construction of the photographing device 2. The photographing device 2 includes: a control part 5; a photographing part 6; an audiovisual data recording part 7; a display part 8; a communication part 9; a photographing area information input part 10; a generating part 11; a photographing area information storage part 12; communication parts 13, 14, and 15; a participant information input part 16; a participant information storage part 17; a driving part 18; a furniture information input part 19; a furniture information storage part 20; an environment information input part 21; an environment information storage part 22; and a data processing part 23. These are connected with each other through a network, lines, or circuits inside the photographing device 2. Other photographing devices will not be described because they are of the same construction as described above.

The photographing device 2 refers to photographing area information of the photographing device, lighting area information of each lighting device, and sound area information of each sound recording device, generates photographing area information representative of a photographing area of each photographing device so that each of the photographing devices cooperatively photographs an photographing object, and controls the photographing area by use of the photographing area information. The control part 5 controls the whole photographing device 2. The control part 5 includes a CPU (Central Processing Unit), a memory, and the like. The photographing part 6 photographs a conference, and outputs the photographed audiovisual data to the storage part 7. The photographing part 6 includes a video camera and the like. Hereinafter, audiovisual data includes moving image data. The storage part 7 records audiovisual data inputted from the photographing part 6. The audiovisual data recorded in the recording part 7 is outputted to the display part 8, the communication part 9, or the data processing part 23 according to the control of the control part 5. The storage part 7 includes a memory, for example. Hereinafter, other storage parts also include a memory. The display part 8 displays audiovisual data inputted from the recording part 7 to the user. The display part 8 includes a display, for example.

The communication part 9 transmits audiovisual data inputted from the recording part 7 to external equipment according to the control of the control part 5. The communication part 13 includes a LAN adaptor and the like, for example. The LAN adaptor forming the communication part 13 may be constructed using wire or wireless communication equipment. Hereinafter, likewise, other communication parts include a LAN adapter and the like.

The photographing area information input part 10 inputs photographing area information such as optical axes or solid angles representative of a photographing area specific to the photographing device 2. The photographing area information input part 10 includes, e.g., a keyboard, a graphical user interface, and the like. Hereinafter, likewise, the input parts include, e.g., a keyboard, a graphical user interface, and the like. Initial photographing area information may be inputted through the photographing area information input part 10. The generating part 11 processes photographing area information inputted from the photographing area information input part 10, and as a result of the processing, stores updated photographing area information in the storage part 12. The generating part 11 includes, e.g., a CPU, a memory, and the like. The storage part 12 stores the photographing area information, and outputs it to the communication part 13 according to the control of the control part 5.

The communication part 13 transmits the photographing area information to other photographing devices 2, lighting devices 3 or sound recording devices 4. The communication part 13 receives photographing area information transmitted from other photographing devices 2, and outputs it to the generating part 11. The communication part 14 receives lighting area information transmitted from the lighting device 3, and outputs it to the generating part 11. The communication part 15 receives lighting area information transmitted from the sound recording device, and outputs it to the generating part 11. The participant information input part 16 inputs conference participant related information such as the positions of the conference participants, the postures of the conference participants, the positions and directions of the heads of the conference participants, visible and audible ranges of the conference participants, and movable ranges of the conference participants. Thereby, control can be conducted taking the conditions of participants into account.

The storage part 17 stores conference participant related information inputted from the participant information input part 16. The conference participant related information stored in the storage part 17 is outputted to the generating part 11 according to the control of the control part 5.

The furniture information input part 19 inputs furniture information such as the position, direction, size, shape, color, and area of furniture such as a table or a whiteboard shared by conference participants or chairs used by the conference participants. By use of these pieces of information, control can be conducted taking the furniture in a conference room into account. The storage part 20 stores the furniture information. The furniture information stored in the storage part 20 is outputted to the generating part 11 according to the control of the control part 5. The environment information input part 21 inputs conference environment information such as the size, shape, and color of a place where a conference is held, the reflection factor of electromagnetic wave such as visible light or soundwave, and information about the afforddance of furniture. The storage part 22 stores conference environment information inputted from the environment information input part 21. The conference environment information stored in the storage part 22 is outputted to the generating part 11 according to the control of the control part 5.

The data processing part 23 processes aural data inputted from the memory part 7. The result of processing audiovisual data is outputted to the generating part 11 according to the control of the control part 5. The data processing part 23 includes a CPU, a memory, and the like.

The generating part 11 generates new photographing area information so that each of the photographing devices 2 cooperatively photographs a photographing object, based on photographing area information inputted from the storage part 12, photographing area information of other photographing devices inputted from the communication part 13, lighting area information of the lighting device 3 inputted from the communication part 14, sound recording area information of the sound recording device 4 inputted from the communication part 15, conference participant related information inputted from the storage part 17, furniture information inputted from the storage part 20, conference environment information inputted from the storage part 22, audiovisual data processing result inputted from the data processing part 23, and the like. The generating part stores the photographing area information in the storage part 12.

The driving part 18 includes a motor for panning, tilting, and zooming video cameras, and a motor for moving the photographing device 2. The driving part 18 changes a photographing area of the photographing device by panning, tilting, and zooming the video cameras and moving the photographing device 2. Therefore, the control part 5 uses photographing area information stored in the storage part 12 and controls a photographing area of the photographing part 6 through the driving part 18. Since each of the photographing devices 2 is controlled to cooperatively photograph a photographing object, plural less redundant images can be obtained.

Figure 3:
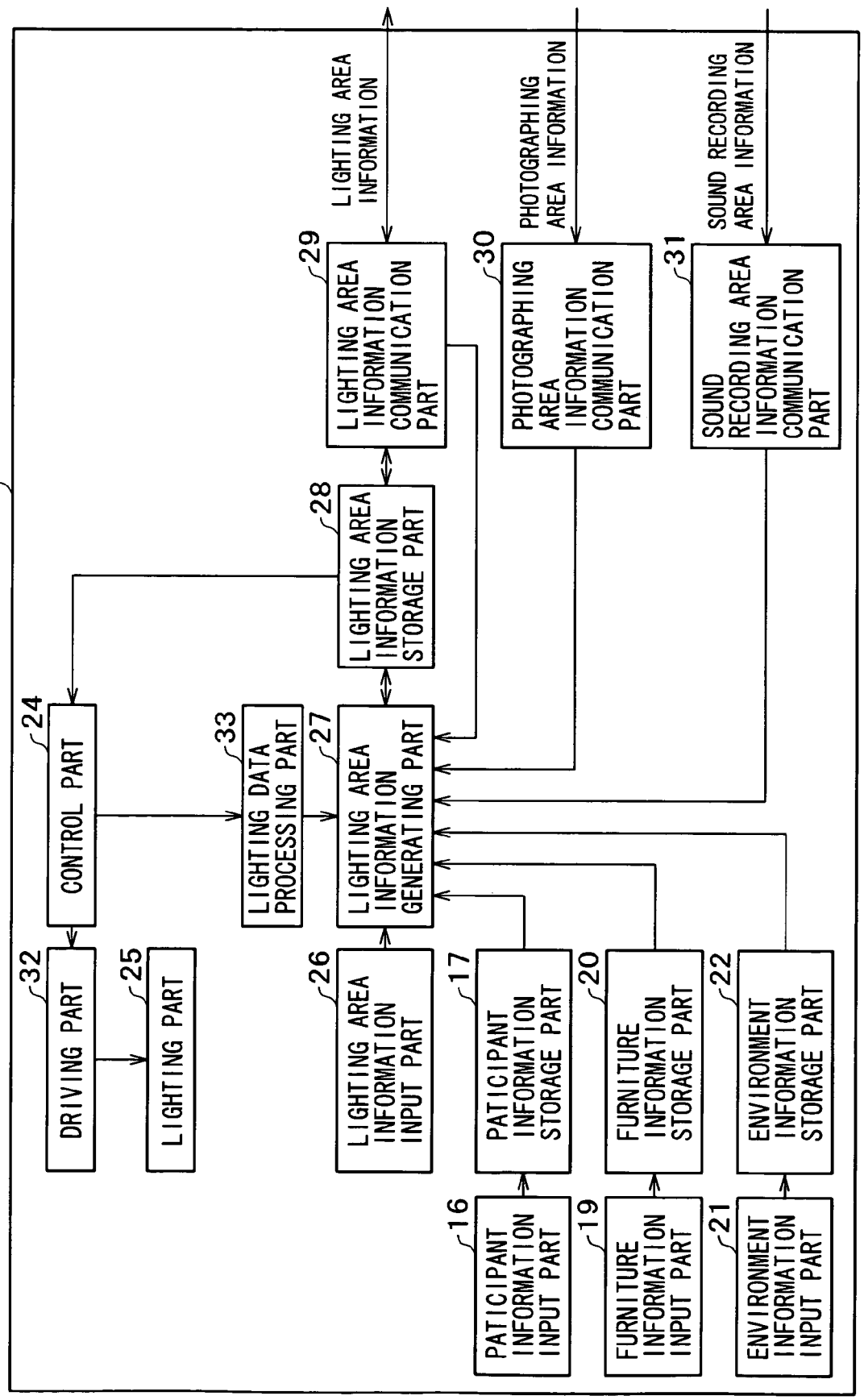
FIG. 3 is a block diagram showing an example of the construction of lighting devices 3.

The following describes the lighting device 3. FIG. 3 is a block diagram showing an example of the construction of the lighting device 3. The lighting device 3 includes: a control part 24; a lighting part 25; a lighting area information input part 26; a generating part 27; a lighting area information storage part 28; communication parts 29, 30, and 31; a driving part 32; a data processing part 33; a participant information input part 16; a participant information storage part 17; a furniture information input part 19; a furniture information storage part 20; an environment information input part 21; and an environment information storage part 22. These are connected with each other through a network, lines, or circuits inside the lighting device 3. Other lighting devices will not be described because they are of the same construction as described above. The lighting device 3 refers to photographing area information of each of the photographing devices, lighting area information of each of the lighting devices, and sound area information of each of the sound recording devices, generates lighting area information representative of a lighting area of the lighting device so that each of the lighting devices cooperatively lights an photographing object, and controls the lighting area by use of the lighting area information. The control part 24 controls the whole lighting device 3. The control part 24 includes a CPU, a memory, and the like. The lighting part 25, which includes a lamp or fluorescent lamp and a reflecting plate and the like, lights conference participants and furniture and the like in a conference room.

The lighting area information input part 26 inputs lighting area information such as solid angles representative of a specific lighting area corresponding to the lighting device 3 concerned. Initial lighting area information maybe inputted through the lighting area information input part 26. The generating part 27 processes lighting area information inputted from the lighting area information input part 26, and stores the processed lighting area information in the storage part 28. The storage part 28 stores lighting area information inputted from the generating part 27. The communication part 29 transmits lighting area information inputted from the storage part 28 to other lighting devices 3, photographing devices 2 or sound recording devices 4.

The communication part 29 receives lighting area information transmitted from other lighting devices 3, and outputs it to the generating part 27. The communication part 30 receives photographing area information transmitted from the photographing device 2, and outputs it to the generating part 27. The communication part 31 receives lighting area information transmitted from the sound recording device 4, and outputs it to the generating part 27.

The participant information input part 16 inputs conference participant related information such as the positions of the conference participants, the postures of the conference participants, the positions and directions of the heads of the conference participants, visible and audible ranges of the conference participants, and movable ranges of the conference participants. Thereby, control can be conducted taking the conditions of participants into account. The storage part 17 stores inputted conference participant related information. The conference participant related information stored in the storage part 17 is outputted to the generating part 27 according to the control of the control part 24.

The furniture information input part 19 inputs furniture information such as the position, direction, size, shape, color, and area of furniture such as a table or a whiteboard shared by conference participants or chairs used by the conference participants. Thereby, control can be conducted taking the furniture into account. The storage part 20 stores the furniture information inputted from the furniture information input part 19. The furniture information is outputted to the generating part 27 according to the control of the control part 24.

The environment information input part 21 inputs conference environment information such as the size, shape, and color of a place where a conference is held, the reflection factor of electromagnetic wave such as visible light or sound wave, and information about the afforddance of furniture. Thereby, control can be conducted taking conference environment into account. The storage part 22 stores conference environment information inputted from the environment information input part 21. The conference environment information is outputted to the generating part 27 according to the control of the control part 24. The data processing part 33 processes data on lighting, and outputs processing results to the generating part 27 according to the control of the control part 24.

The generating part 27 generates lighting area information so that each of the photographing devices 2 cooperatively lights a photographing object, based on lighting area information inputted from the storage part 28, lighting area information of other lighting devices 3 inputted from the communication part 29, photographing area information of the photographing device 2 inputted from the communication part 30, sound recording area information of the sound recording device 4 inputted from the communication part 31, conference participant related information inputted from the storage part 17, furniture information inputted from the storage part 20, conference environment information inputted from the storage part 22, lighting data processing result inputted from the data processing part 33, and the like. The generating part 27 stores the lighting area information in the storage part 28.

The driving part 32 includes a motor for panning and tilting lights or fluorescent lamps, and a motor for moving the lighting device 3. The driving part 32 pans and tilts lights or fluorescent lamps, and moves the lighting device 3 to control a lighting area of the lighting device 3. Therefore, the control part 24 uses lighting area information stored in the storage part 28 and controls a photographing area of the lighting part 25 through the driving part 32. Since each of the lighting devices 3 is controlled to cooperatively light a photographing object, plural less redundant lightings become possible.

Figure 4:
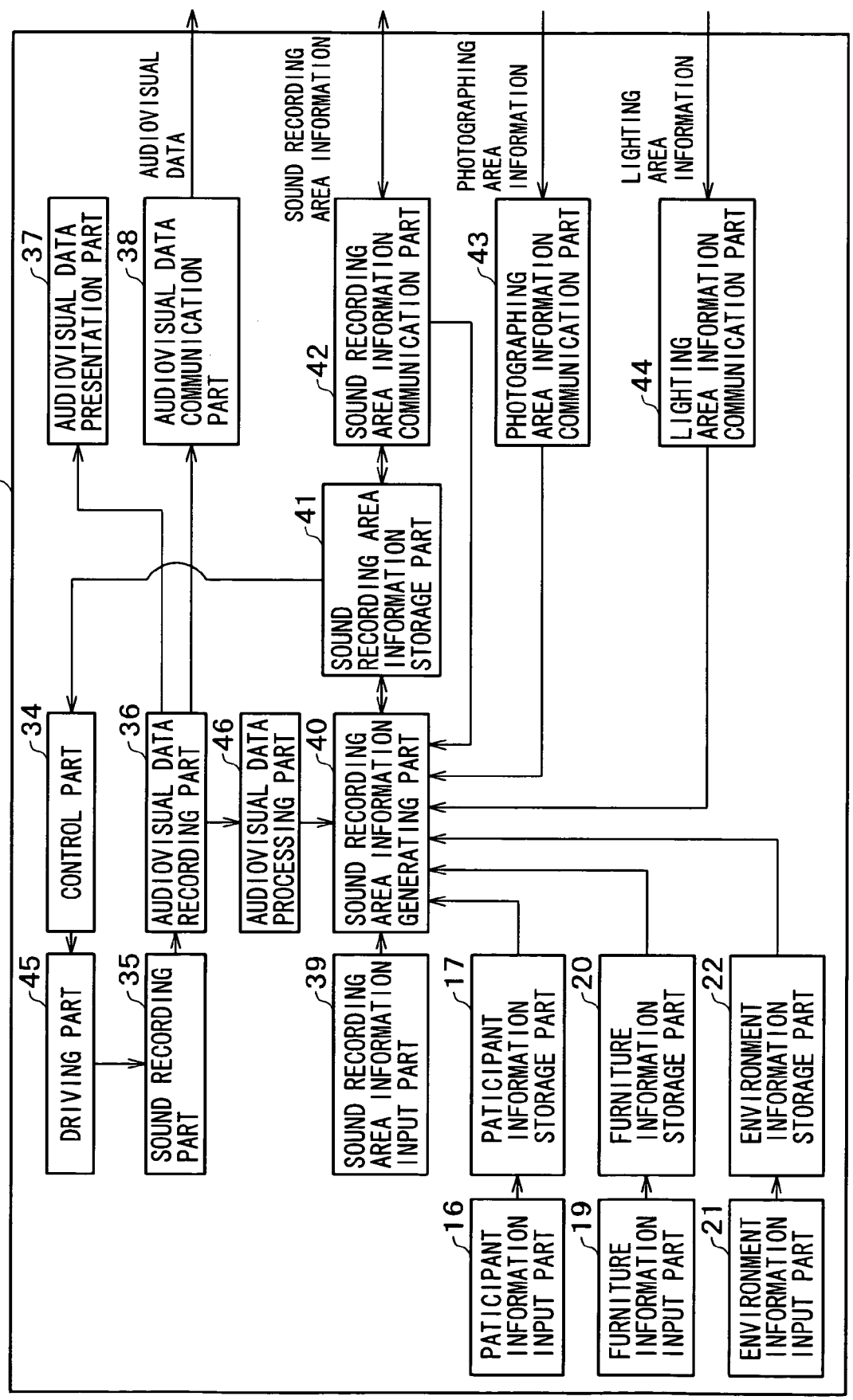
FIG. 4 is a block diagram showing an example of the construction of sound recording devices 4.

The following describes the sound recording device 4. FIG. 4 is a block diagram showing an example of the construction of the sound recording device 4. The sound recording device 4 includes: a control part 34; a sound recording part 35; an audiovisual data recording part 36; a presentation part 37; a communication part 38; a sound recording area input part 39; a generating part 40; a sound recording area information storage part 41; communication parts 42, 43, and 44; a driving part 45; a data processing part 46; a participant information input part 16; a participant information storage part 17; a furniture information input part 19; a furniture information storage part 20; an environment information input part 21; and environment information storage part 22. These are connected with each other through a network, lines, or circuits inside the sound recording device 4. Other sound recording devices will not be described because they are of the same construction as described above.

The each sound recording device 4 refers to photographing area information of each of the photographing devices, lighting area information of each of the lighting devices, and sound area information of each of the sound recording devices, generates sound recording area information representative of a sound recording area of each of the sound recording devices so that each of the sound recording devices cooperatively records sound information, and controls the sound recording area by use of the sound recording area information. The control part 34 controls the whole sound recording device 4. The control part 34 includes a CPU, a memory, and the like. The sound recording part 35 records audiovisual data such as voice uttered from conference participants and sounds generated during a conference. The audiovisual data includes acoustic data. The sound recording part 35 includes a microphone, an amplifier, and a loudspeaker for monitoring acoustic data, a headphone, and the like.

The recording part 36 stores audiovisual data inputted from the sound recording part 35. The audiovisual data recorded in the recording part 36 is outputted to the presentation part 37, the communication part 38, and the data processing part 46 according to the control of the control part 34. The presentation part 37 presents audiovisual data inputted from the recording part 36 to the user. The presentation part 37 includes a loudspeaker and the like. The communication part 38 transmits audiovisual data inputted from the recording part 36 to external equipment according to the control of the control part 34.

The sound recording area information input part 39 inputs sound recording area information such as solid angles representative of a sound recording area specific to the sound recording device 4. Initial sound recording area information is inputted through the sound recording area input part 39. The generating part 40 processes sound recording area information inputted from the sound recording area input part 39, and outputs the processed sound recording area information to the storage part 41. The generating part 40 includes a CPU, a memory, and the like. The storage part 41 stores sound recording area information inputted from the generating part 40. The sound recording area information stored in the storage part 41 is outputted to the communication part 42 according to the control of the control part 34.

The communication part 42 transmits sound recording area information inputted from the storage part 41 to the photographing device 2, the lighting device 3 or other sound recording devices 4. The communication part 42 receives sound recording area information transmitted from other sound recording devices 4, and outputs it to the generating part 40. The communication part 43 receives photographing area information transmitted from the photographing device 2, and outputs it to the generating part 40. The communication part 44 receives lighting area information transmitted from the lighting device 3, and outputs it to the generating part 40.

The participant information input part 16 inputs conference participant related information such as the positions of the conference participants, the postures of the conference participants, the positions and directions of the heads of the conference participants, visible and audible ranges of the conference participants, and movable ranges of the conference participants. Thereby, control can be conducted taking the conditions of participants into account. The storage part 17 stores conference participant related information inputted from the participant information input part 16. The conference participant related information recorded in the storage part 17 is outputted to the generating part 40 according to the control of the control part 34.

The furniture information input part 19 inputs furniture information such as the position, direction, size, shape, color, and area of furniture such as a table or a whiteboard shared by conference participants or chairs used by the conference participants. Thereby, control can be conducted taking the furniture into account. The storage part 20 stores the furniture information inputted from the furniture information input part 19. The furniture information stored in the storage part 20 is outputted to the generating part 40 according to the control of the control part 34.

The environment information input part 21 inputs conference environment information such as the size, shape, and color of a place where a conference is held, the reflection factor of electromagnetic wave such as visible light or sound wave, and information about the afforddance of furniture. Thereby, control can be conducted taking the furniture into account. The storage part 22 stores the conference environment information inputted from the environment information input part 21. The conference environment information stored in the storage part 22 is outputted to the generating part 40 according to the control of the control part 34. The data processing part 46 processes audiovisual data inputted from the recording part 36, and according to the control of the control part 34, outputs the result of processing the audiovisual data to the generating part 40.

The generating part 40 generates sound recording area information so that each of the sound recording devices 4 cooperatively records sound information, based on sound recording area information inputted from the storage part 41, sound recording area information of other sound recording devices 4 inputted from the communication part 42, photographing area information of the photographing device 2 inputted from the communication part 43, lighting area information of the lighting device 3 inputted from the communication part 44, conference participant related information inputted from the storage part 17, furniture information inputted from the storage part 20, conference environment information inputted from the storage part 22, audiovisual data processing result inputted from the data processing part 46, and the like. The generating part 40 stores the sound recording area information in the storage part 41.

The driving part 45 includes a motor for controlling the direction and angle of a microphone, a motor for moving the sound recording device 4, and the like. The driving part 45 changes a sound recording range of the sound recording device 4 by controlling the direction and angle of the microphone, and moving the sound recording device 4. Therefore, the control part 34 uses sound recording area information stored in the storage part 41 and controls a sound recording area of the sound recording part 35 through the driving part 45. Since each of the sound recording devices 4 is controlled to cooperatively record sound information, plural less redundant pieces of audiovisual data, acoustic data, or voice data can be recorded.

Figure 5:
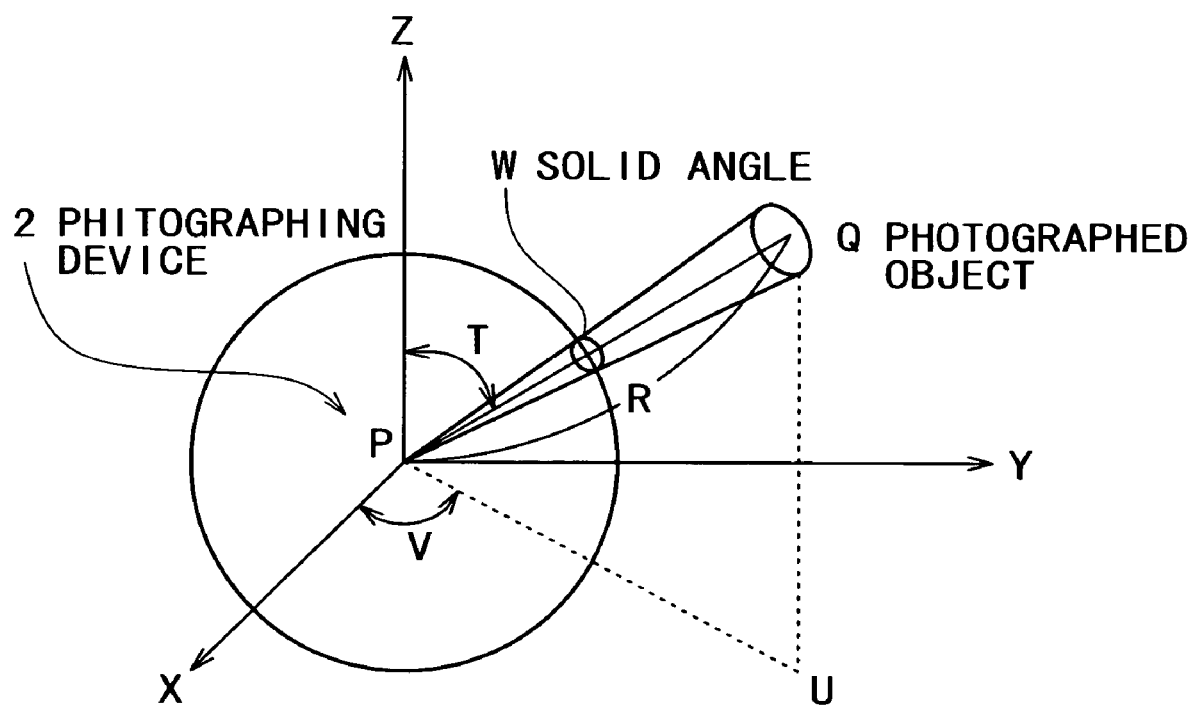
FIG. 5 is a drawing to explain parameters concerning photographing area information.

The following describes data representative of photographing area information. FIG. 5 is a drawing to explain parameters concerning photographing area information. In FIG. 5, the photographing device 2 is placed at point P on a three-dimensional space. A line PQ connecting a point Q in the photographing direction of the photographing device 2 and the point P forms an angle of T with a normal (line PZ) to an X-Y plane that intersects with the point P on the X-Y plane. A photographing object is in the point Q. The point Q is projected in a point U on the X-Y plane. A line PU forms an angle of V with the X axis. For a cone containing a point of intersection of a unit sphere with the point P at center and the line PQ, a solid angle for the cone is represented as W. The distance between the line PQ is represented by R.

The photographing area information can be represented by coordinates (X,Y,Z) of the point P, the angle T formed with the normal, the angle V formed by the line PU and the X axis, the solid angle W, the distance R to the object, the specification of the photographing device 2 and camera, and time t identifying the parameters. Here, the angle V of the line PU from the X axis will be referred to as an azimuth for the sake of convenience. Descriptions of a lighting area and a sound recording area are omitted because they are described like the photographing area.

FIG. 6 is a drawing showing a photographing area information table 47 representative of photographing area information held in the photographing area information storage part 12. The photographing area information table 47 is stored in the storage part 12. The photographing area information table 47 is rewritten by the generating part 11. The photographing area information table 47 includes a photographing device identifier 47*a*, coordinates 47*b*, an angle 47*c* formed with a normal, an azimuth 47*d*, a solid angle 47*e*, a distance 47*f*, camera specification 47*a*, and time 47*h*.

As shown in FIG. 6, a first photographing device has the photographing device identifier 47*a* "CAM0", the coordinates 47*b* "(0,0,0)", the angle 47*c* "T=45°" formed with a normal, the azimuth 47*d* "V=10°", the solid angle 47*e* "W=1", the distance 47*f* "R=1", the camera specification 47*g* "camera A capable of panning, tilting, and zooming", and the time 47*h* "1."

A second photographing device has the photographing device identifier 47*a* "CAM1", the coordinates 47*b* "(0,1,0)", the angle 47*c* "T=60°" formed with a normal, the azimuth 47*d* "V=2°", the solid angle 47*e* "W=2", the distance 47*f* "R=2", the camera specification 47*g* "camera B capable of panning, tilting, and zooming", and the time 47*h* "2." A third photographing device has the photographing device identifier 47*a* "CAM2", the coordinates 47*b* "(1,1,0)", the angle 47*c* "T=70°" formed with a normal, the azimuth 47*d* "V=3°", the solid angle 47*e* "W=3", the distance 47*f* "R=2", the camera specification 47*g* "camera C capable of panning, tilting, and zooming", and the time 47*h* "3."

The following describes data representative of lighting area information. Like the photographing area information, lighting area information can be represented by coordinates (X',Y',Z') of the lighting device 3, an angle formed with a normal T', azimuth V', solid angle W', distance R', the specification of the lighting device 3 and lamps, and time t' identifying the parameters.

FIG. 7 is a drawing showing a lighting area information table 48 representative of lighting area information held in the lighting area information storage part 28. The lighting area information table 48 is stored in the storage part 28. The lighting area information table 48 is rewritten by the generating part 27. The lighting area information table 48 includes a lighting device identifier 48*a*, coordinates 48*b*, an angle 48*c* formed with a normal, an azimuth 48*d*, a solid angle 48*e*, a distance 48*f*, camera specification 48*a*, and time 48*h*.

As shown in FIG. 7, a first lighting device has the lighting device identifier 48*a* "LIGHT0", the coordinates 48*b* "(0,0, 1)", the angle 48*c* "T=45°" formed with a normal, the azimuth 48*d* "V'=11°", the solid angle 48*e* "W'=1", the distance 48*f* "R'=1", the light specification 48*g* "lighting A", and the time 48*h* "4." A second lighting device has lighting device identifier 48*a* "LIGHT1", coordinates 48*b* "(0,1,1)", angle 48*c* "T=60°" formed with a normal, azimuth 48*d* "V'=11°", solid angle 48*e* "W'=2", distance 48*f* "R'=2", light specification 48*g* "lighting B", and time 48*h* "5."

The following describes data representative of sound recording area information. Like the photographing area information, sound recording area information can be represented by coordinates (X",Y", Z") of the sound recording device 4, an angle formed with a normal T", azimuth V", solid angle W", distance R", the specification of the sound recording device 4 and microphones, and time t" identifying the parameters. FIG. 8 is a drawing showing a sound recording area information table 49 representative of sound recording area information held in the storage part 41.

The sound recording area information table 49 is stored in the storage part 41. The sound recording area information table 49 is rewritten by the generating part 40. The sound recording area information table 49 includes a sound recording device identifier 49a, coordinates 49b, an angle 49c formed with a normal, an azimuth 49d, a solid angle 49e, a distance 49f, microphone specification 49a, and time 49h. As shown in FIG. 8, a first sound recording device has the sound recording device identifier 49a "MIC0", the coordinates 49b "(0,0,0)", the angle 49c "T"=45°" formed with a normal, the azimuth 49d "V"=1°", the solid angle 49e "W"=1", the distance 49f "R"=1", the microphone specification 49g "microphone A", and the time 49h "6." A second sound recording device has the sound recording device identifier 49a "MIC1", the coordinates 49b "(0,0,1)", the angle 49c "T"=60°" formed with a normal, the azimuth 49d "V"=3°", the solid angle 49e "W"=2", the distance 49f "R"=2", the microphone specification 49g "microphone B", and the time 49h "7."

The angle 49c formed with a normal, the azimuth 49d, and the solid angle 49e can be identified by use of a sound source location method of conventional technology. For example, as one of sound source location methods, Nakajima et al. : "Improving the Performance of a Sound Source Location System by Sound Pressure Difference Information Load," Paper Magazine of the Institute Electronic, Information and Communication and Engineers, VOL. J87-D-II No. 3, 2004, pp. 919-922 can be used. The abovementioned generating parts 11, 27, and 40 generate photographing area information, lighting area information, or sound recording area information by use of position information (coordinates 47b) of the photographing devices 2, position information (coordinates 48b) of the lighting devices 3, or position information (coordinates 48b) of the sound recording devices 4.

Figure 9:
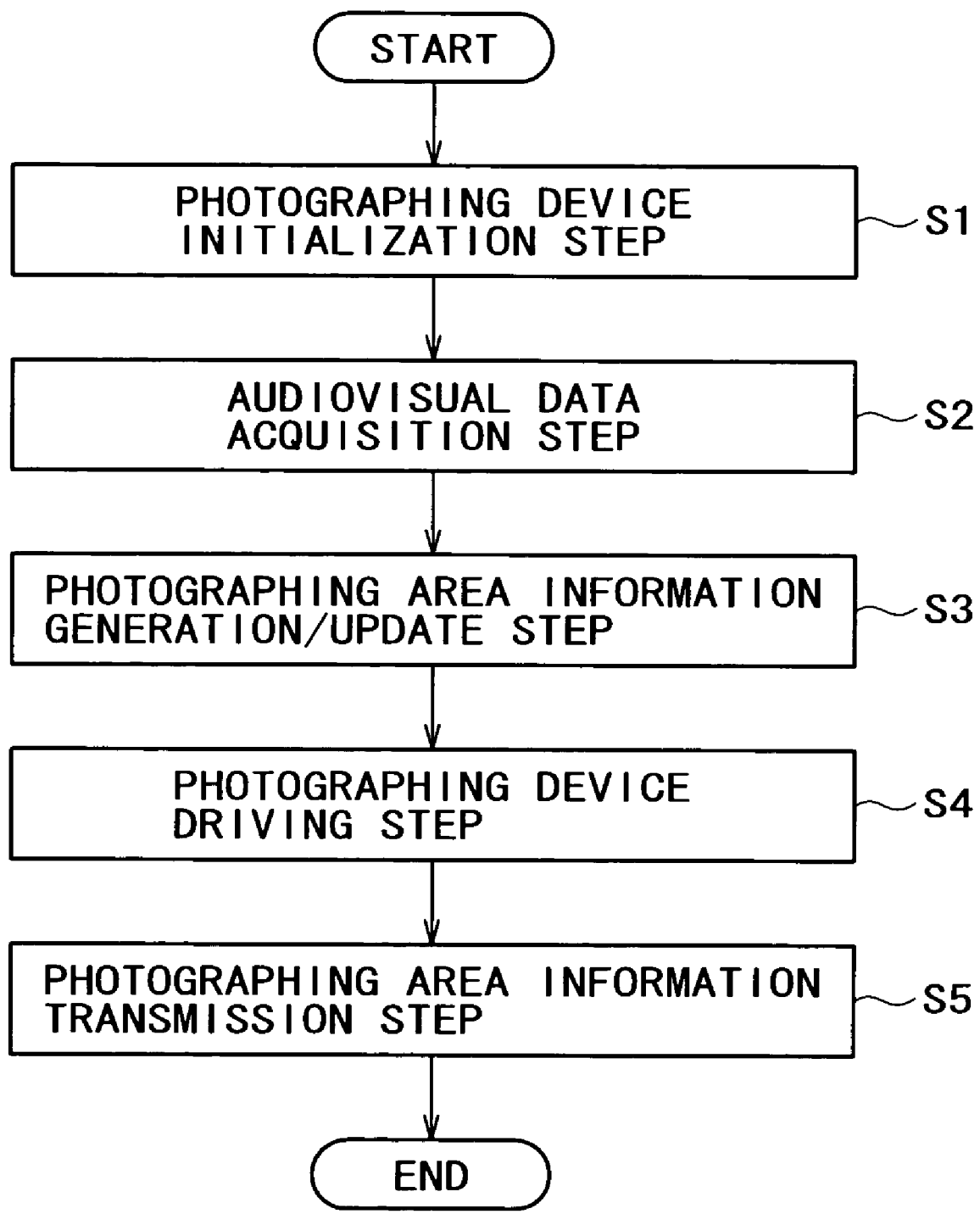
FIG. 9 is a flowchart showing a photographing procedure in photographing devices 2.

The following describes a photographing procedure in the photographing device 2. FIG. 9 is a flowchart showing a photographing procedure in the photographing device 2. As shown in FIG. 9, the photographing procedure includes a photographing device initialization Step S1, an audiovisual data acquisition Step S2, a photographing area information generation/update Step S3, a photographing area information transport Step S4, and a photographing device drive Step S5. In Step S1, the control part 5 of the photographing device 2 initializes parts of the photographing device 2. In Step S2, the photographing part 6 photographs a conference, and outputs photographed moving image data or audiovisual data to the storage part 7. On the other hand, the storage part 7 outputs the audiovisual data to the display part 8, the audiovisual data communications part 9, or the audiovisual data processing part 23 according to the control of the control part 5.

In Step S3, the generating part 11 generates new photographing area information so that each of the photographing devices 2 cooperatively photographs a photographing object, based on unupdated photographing area information inputted from storage part 12, photographing area information of other lighting devices inputted from the communication part 13, lighting area information of the lighting device inputted from the communication part 14, sound recording area information of the sound recording device inputted from the communication part 15, conference participant related information inputted from the storage part 17, furniture information inputted from the storage part 20, conference environment information inputted from the storage part 22, audiovisual data processing result inputted from the audiovisual data processing part 23, and the like.

The generating part 11 stores the generated photographing area information in the storage part 12. Thereby, the contents of the photographing area information table 47 shown in FIG. 6 are updated. Furthermore, the storage part 12 outputs the held photographing area information to the communication part 13 according to the control of the control part 5. The generating part 11 may also extract the area where a figure exists based on the figure's characteristic quantities from audiovisual data captured by the photographing device 2, and generate photographing area information from the extracted area information. Also in the case of the lighting devices 3 or the sound recording devices 4, lighting area information or sound recording area information may be generated using the area where the figure exists.

As a method of extracting the area where a figure exists based on the figure's characteristic quantities, "a template to determine a figure area with a face area as reference" described in Ide et. al: "Estimating Background Scenes by Separating Figures in News Video," Paper Magazine of the Institute Electronic, Information and Communication and Engineers, D-II Vol. J84-D-II No. 8 pp. 1856-1863 August 2001 can be applied. Specifically, when a photographing object is a figure, by identifying a figure area using a template to determine a figure area with the face area as reference, a solid angle W corresponding to the figure area can be identified. The generating part 11 identifies solid angle W based on the audiovisual data captured by the photographing part 6 of the photographing device 2, and stores it in the photographing area information table 47 in the storage part 12.

Angle T formed with a normal, azimuth V, and the like can be identified from the photographing part 6 of a camera or the like. Distance R to a targeted figure can be identified using so-called distance images by conventional stereoscopy. As a method of acquiring distance images by stereoscopy, Sagawa et. al: "Research (5) on High-Speed Surface Reconstruction Method—Real-time Time-Space Reconstruction for Robots by Use of Distance Images from Plural Viewpoints," 17th Congress of the Robotics Society of Japan (September 1999) can be used. The generating part 11 identifies angle T formed with a normal, azimuth V, and the like from the photographing part 6 of a camera and the like, and stores them in the photographing area information table 47 of the storage part 12.

The following additionally describes a procedure of the photographing area information generating part 11. The generating part 11 generates new photographing area information based on initial (or the first preceding or past) photographing area information of its own photographing device 2 and photographing area information of other photographing devices 2 so that each of the photographing devices 2 can record audiovisual data and video data that are necessary as conference records. As a method of operating the photographing area information, the photographing area information is generated so that overlap between photographing areas of the photographing devices 2 is maximally avoided, that is, the contents of the whole audiovisual data are least redundant.

As a method of operating photographing area information, the photographing area information may be operated so that a figure area identified by the abovementioned method becomes maximum in a photographing area of the photographing device 2. Accordingly, as an evaluation function to decide a method of operating photographing area information, an evaluation function is defined which includes a reciprocal of a function representative of redundancy and a function representative of a figure area in the photographing device 2. The generating part 11 operates the photographing area information by use of the evaluation function so that the evaluation function becomes maximum.

For example, if overlap between photographing areas of the photographing devices 2 at time t is expressed as OverlapBtwnCamAndCam(t) to represent redundancy, its reciprocal is expressed as 1/OperlapBtwnCamAndCam(t). Assume that the photographing devices 2 are numbered, their index or number is i, the number of all pixels of a screen of an i-th photographing device 2 at time t is represented by PixelsOfCamera(t,i), and a figure area photographed by the i-th photographing device 2 at time t is represented by PixelsOfFigure(t,i). Then, a function representative of the effectiveness of the figure area in the photographing device 2 at time t can be defined as the sum total of PixelsOfFigure(t,i)/PixelsOfCamera(t,i). Accordingly, an evaluation function Ecamera(t) for deciding a method of operating photographing area information can be defined as shown by Expression 1.

a, b, and w in Expression 1 designate coefficients, and imax designates the total number of the photographing devices 2. The generating part 11 can define a different evaluation function or change photographing area information based on the result, using lighting area information inputted from the communication part 14, sound recording area information inputted from the communication part 15, conference participant related information inputted from the storage part 17, furniture information inputted from the storage part 20, and conference environment information inputted from the storage part 22.

$$Ecamera(t) = a\frac{1}{OverlapBtwnCamAndCam(t)} + b\sum_{i=1}^{imax} \frac{wPixelsOfFigure(t, i)}{PixelsOfCamera(t, i)}$$ [Expression 1]

For example, based on lighting area information inputted from the communication part 14, OverlapBtwnCamAndLight(t,i,j) can be defined to represent an overlap between a photographing area of i-th photographing device 2 and a lighting area of j-th lighting device 3 at time t. Likewise, based on sound recording area information inputted from the communication part 15, OverlapBtwnCamAndMic(t,i,k) can be defined to represent an overlap between a photographing area of i-th photographing device 2 and a sound recording area of k-th sound recording device 4 at time t.

A second evaluation function Ecamera2(t) concerning a photographing area can be defined as shown by Expression 2, using the abovementioned evaluation function Ecamera(t) concerning a photographing area and the OverlapBtwnCamAndLight(t,i,j) and OverlapBtwnCamAndMic(t,i,k).

c and d in Expression 2 designates coefficients, j designates an index representative of j-th lighting device 3, and jmax designates the total number of the lighting devices 3. k designates an index representative of k-th sound recording device 4, and kmax designates the total number of the sound recording devices 4. A coefficient w in Expression 1 can be controlled based on the contents of conference participant related information inputted from the storage part 17.

$$Ecamera2(t) = Ecamera(t) + c\sum_{j=1}^{jmax}\sum_{i=1}^{imax} OverlapBtwnCamAndLight(t, i, j) + d\sum_{k=1}^{kmax}\sum_{i=1}^{imax} OverlapBtwnCamAndMic(t, i, k)$$ [Expression 2]

For example, when the importance of conference participants in a conference such as the posts of the conference participants can be identified using so-called RFID (Radio Frequency Identification), a personnel information database, and the like, the coefficient w can be controlled according to the importance of the conference participants. Specifically, w can be specified as 100 for a president, 90 for engineering executives, and 80 for section leaders. Assume that the personnel information database contains employee numbers as identifiers, with a post recorded for each of the employee numbers, RFID records the employee numbers, and its data is transmitted and received. In this case, when employees having RFID participate in a conference, the employee numbers can be identified by receiving the RFID data, and time t when the data is received can be identified.

On the other hand, the photographing device 2 can identify employee numbers from the place of a conference room, wave strength during RFID data reception, face recognition processing for images captured by the photographing device 2, or reference to the personnel information database. By searching the personnel information database for the identified employee numbers, the posts of conference participants can be identified. The coefficient w corresponding to the conference participants can be identified from the identified posts. Furthermore, the generating part 11 can define an evaluation function for operating a photographing area by use of furniture information inputted from the storage part 20 and conference environment information inputted from the storage part 22.

Based on the furniture information inputted from the storage part 20, OverlapBtwnCamAndFur1(t,i,m) can be defined to represent an overlap between a photographing area of i-th photographing device 2 and a furniture area of m-th furniture at time t. Likewise, based on furniture information inputted from the storage part 20, OverlapBtwnCamAndFur2(t,i,n) can be defined to represent an overlap between a photographing area of i-th photographing device 2 and a furniture area of n-th furniture at time t.

Based on the conference environment information inputted from the storage part 22, OverlapBtwnCamAndAttention(t, i,o) can be defined to represent an overlap between a photographing area of i-th photographing device 2 and o-th focused area derived from conference environment information at time t. A third evaluation function Ecamera3(t) concerning a photographing area can be defined as shown by Expression 3, using the abovementioned second evaluation function Ecamera2(t) concerning a photographing area and OverlapBtwnCamAndFur1(t,i,m) as well as OverlapBtwnCamAndAttentionFur2(t,i,n) and OverlapBtwnCamAndAttention(t,i,o).

e, f, and g designate coefficients, m designates an index representative of furniture such as m-th table, n designates an index representative of furniture such as n-th chair, o designates an index representative of o-th focused area, mmax designates the total number of pieces of furniture such as table, nmax designates the total number of pieces of furniture such as chair and omax designates the total number of areas to be focused on (referred to as focused areas) such as whiteboard and projector screen. The surface of furniture such as table may be desired to be recorded as audiovisual data or video data. Such an item is expressed as OverlapBtwnCamAndFur1(t,i,m), which is part of the third evaluation function Ecamera3(t) concerning photographing areas.

$$Ecamera3(t) = Ecamera2(t) +$$ [Expression 3]
$$e \sum_{m=1}^{mmax} \sum_{i=1}^{imax} OverlapBtwnCamAndFur1(t, i, m) +$$
$$f \sum_{n=1}^{nmax} \sum_{i=1}^{imax} \frac{1}{OverlapBtwnCamAndFur2(t, i, n)} +$$
$$g \sum_{o=1}^{omax} \sum_{i=1}^{imax} OverlapBtwnCamAndAttention(t, i, o)$$

On the other hand, furniture such as chairs may not be desired to be recorded as audiovisual data or video data. Such an item is expressed as the reciprocal of OverlapBtwnCamAndFur2(t.,i,m), which is part of the third evaluation function Ecamera3(t) concerning photographing areas.

The generating part 11 generates photographing area information so that mutual gaze between conference participants and the gaze of the conference participants into a whiteboard can be photographed. By applying conventional technology, the mutual gaze between conference participants and the gaze of the conference participants into a whiteboard can be detected. For example, according to Miyake et al.: "Gaze Determining Method Independent of Face Direction," Paper Magazine of the Institute Electronic, Information and Communication and Engineers, Vol. J86-D-II, No. 12, December 2003, pp. 1737-1744, a pair of right and left marks is stuck at predetermined positions on a face to perform image processing so that displacement quantities of irises of the eyes are measured to determine gaze from the measuring result.

This technology may be applied to determine whether conference participants gaze at a whiteboard or one another. The method proposed by Miyake et al. requires that a pair of right and left marks be stuck. In contrast, by identifying right and left heads of the eyes by image processing instead of the marks, the present invention uses a middle point of right and left heads of the eyes to measure displacement quantities of irises of the eyes and identifies a gaze direction based on the displacement quantities. Specifically, as apparent from the paper by Miyake et al., it is easy to obtain binarized images containing heads of the eyes by conventional technology.

It is also possible to identify rectangles containing (circumscribing) right and left eyes. With these facts in mind, after determining areas of the rectangles containing the right and left eyes, portions (pixels) corresponding to heads of the eyes can be identified by searching for areas or pixels of the eyes from sides nearest to each other of the two rectangles corresponding to the right and left eyes. If areas of the right and left heads of the eyes have been identified, a middle point of the right and left heads of the eyes can be identified. Subsequent processing can be performed by the same method as one by Miyake et al. to measure displacement quantities of irises of the eyes. A gaze direction of a specified conference participant can be identified based on the middle point of the right and left heads of the eyes and the measured displacement quantities of irises of the eyes. A gaze direction is identified in a specific time unit, e.g., every second, and whether the direction change is identified, whereby whether the conference participant is gazing or not can be identified.

New photographing area information can be generated from photographing area information such as the locations of the photographing device 2 and the abovementioned gaze direction of a conference participant. Specifically, if it is assumed that a conference participant is identified as a photographing area at a current point, photographing area information already includes the position (X,Y,Z) of the photographing device 2, angle T formed with a normal, azimuth V, solid angle W, and distance R from the conference participant. Furthermore, since a gaze direction of the conference participant is identified by the abovementioned method, when the conference room is surrounded by walls and the conference participant is gazing at a whiteboard or the like, a new photographing area at which the conference participant is gazing can be identified.

A sight line can be measured by applying Ono et al.: "Sight Line Measuring Technology as Human Interface and Its Application," System Integration Department Lecture by the Society of Instrument and Control Engineers (SI2002), p. 117-118. By use of the measured sight line result and conventional face recognition technology, mutual gaze between conference participants and the gaze of the conference participants at specific items can be identified.

Figure 10:
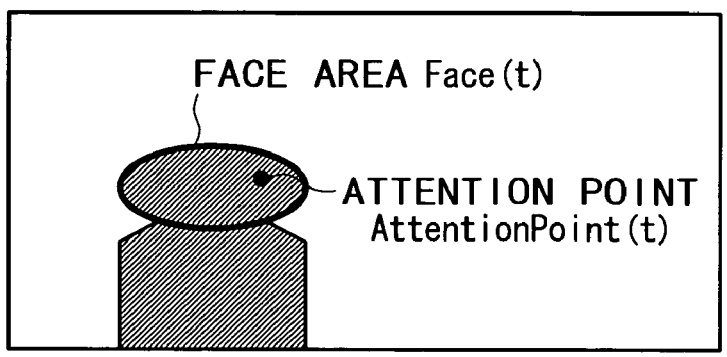
FIG. 10 is a drawing showing a face area and an attention point during gazing.

Specifically, as shown in FIG. 10, mutual gaze can be identified by determining whether an attention point AttentionPoint(t) is contained in a face area Face(t) of a conference participant at time t. FIG. 10 is a drawing showing a face area and an attention point during gazing. For example, when participants A and B participate in a conference, if as gazing condition 1, attention point AttionPoint_B(t) of conference participant B is contained in face area Face_A(t) of conference participant A, as gazing condition 2, attention point AttentionPoint_A(t) of conference participant A is contained in face area Face_B(t) of conference participant B, and the gazing condition 1 and the gazing condition 2 are satisfied for required time of a threshold value or greater, it can be determined that the participants A and B are gazing at each other.

Gazing can be identified by defining an area to be focused on (focused area) instead of the participant B and determining whether the attention point of the participant A is contained in the focused area. Furthermore, by use of the voice recognition technology in addition to the sight line measurement technology and the face recognition technology, the time zone during which conference participants are discussing can be identified. Specifically, the time zone during which silent sections are within a predetermined time and speakers are alternated can be defined as discussion. Utterance sections other than discussion portions can be defined as soliloquies. These processings are performed by the audiovisual data processing part 23 and the generating part 11.

Referring back to FIG. 9, in Step S4, according to the control of the control part 5, the driving part 18 pans, tilts, and zooms a video camera, and moves the photographing part 6. Thereby, the photographing area of the photographing part 6 can be controlled. In Step S5, the communication part 13 transmits photographing area information inputted from the storage part 12 to the communication parts 13 of other photographing devices 2. The communication part 13 receives photographing area information transmitted from the communication parts 13 of other photographing devices 2, and outputs it to the generating part 11. The generating part 11 generates photographing area information at the next point and stores it in the storage part 12.

Figure 11:
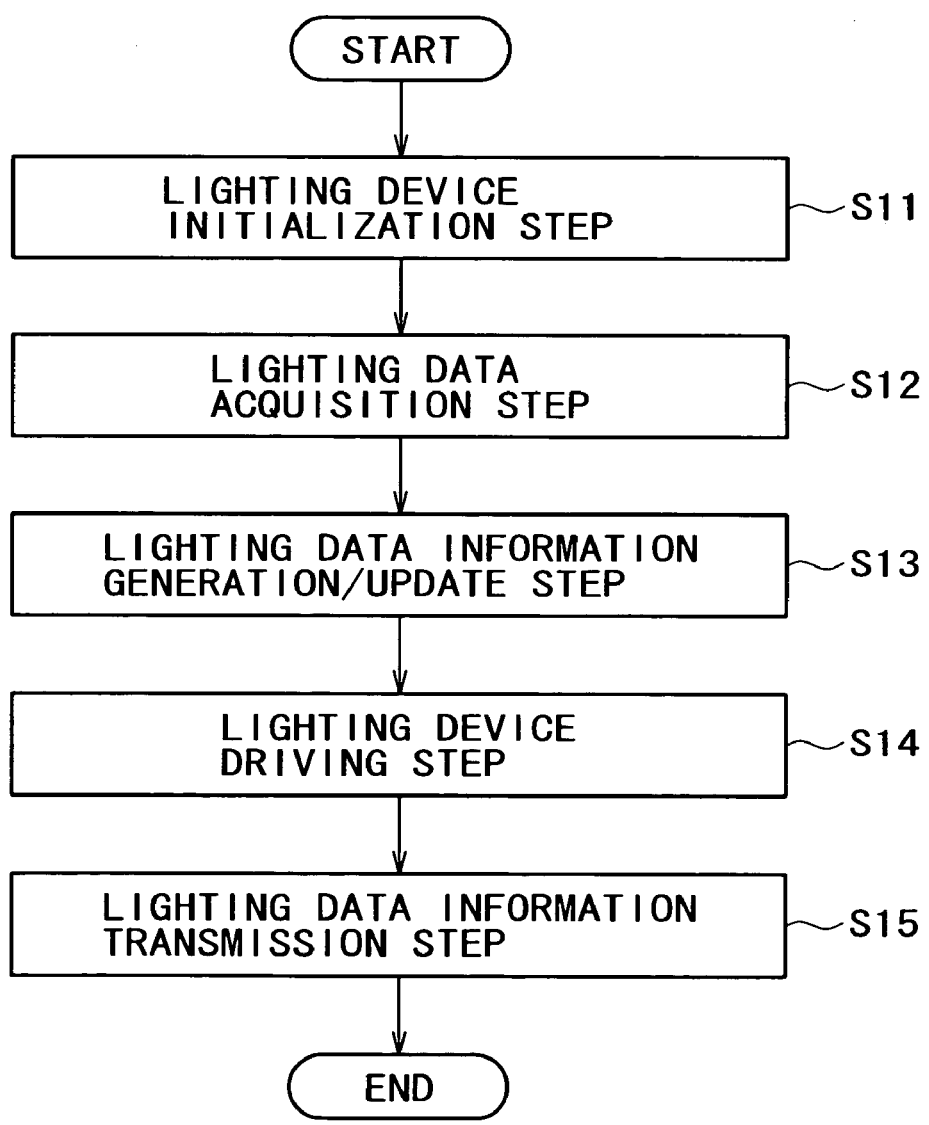
FIG. 11 is a flowchart showing a lighting procedure in lighting devices 3.

The following describes a lighting procedure in the lighting device 3. FIG. 11 is a flowchart showing a lighting procedure in the lighting device 3. As-shown in FIG. 11, the lighting procedure includes: lighting device initialization Step S11; lighting data acquisition Step S12; lighting area information generation/update Step S13; lighting area information transmission Step S14; and lighting device driving Step S15.

In Step S11, the control part 24 initializes parts of the lighting device 3. In Step S12, the lighting data processing part 33 processes data concerning lighting and outputs processing results of the processed lighting data to the generating part 27. In Step S13, the generating part 27 generates new lighting area information so that each of the lighting devices cooperatively lights a photographing object, based on lighting area information inputted from the storage part 28, lighting area information inputted from the communication part 29, photographing area information inputted from the communication part 30, sound recording area information inputted from the communication part 31, conference participant related information inputted from the storage part 17, furniture information inputted from the storage part 20, conference environment information inputted from the storage part 22, and lighting data processing result inputted from the lighting data processing part 33.

The generating part 27 stores the generated lighting area information in the storage part 28. Thereby, the lighting area information table 48 shown in FIG. 7 is rewritten. The lighting area information stored in the storage part 28 is outputted to the communication part 29 according to the control of the control part 24. The generating part 27 may extract the area where a figure is photographed based on the figure's characteristic quantities from audiovisual data captured by the photographing device 2, and generate lighting area information from the extracted area information. As such a method of extracting the area where a figure is photographed based on a figure's characteristic quantities, "a template to determine a figure area with a face area as reference" described in Ide et. al: "Estimating Background Scenes by Separating Figures in News Video," Paper Magazine of the Institute Electronic, Information and Communication and Engineers, D-II Vol. J84-D-II No. 8 pp. 1856-1863 August 2001 can be applied.

The following additionally describes a procedure of the lighting area information generating part 27. The generating part 27 generates new lighting area information based on initial (or the first preceding or past) lighting area information of its own lighting device 3 and lighting area information of other lighting devices 3 so that each of the lighting devices 3 can record audiovisual data and video data that are necessary as conference records. As a method of operating the lighting area information, setting can be made to operate the lighting area information so that overlap between lighting areas of the lighting devices 3 is maximally avoided, that is, the contents of lighting data in the whole audiovisual data are least redundant.

As a method of operating the lighting area information, setting can be made to operate the lighting area information so that a figure area identified by the abovementioned method is maximum in a lighting area of each of the lighting devices 3. Accordingly, as an evaluation function for deciding a method of operating the lighting area information, an evaluation function can be defined which includes the reciprocal of a function representative of redundancy and a function representative of a figure area in each of the lighting devices 3. The generating part 27 uses the evaluation function to operate the lighting area information so that the evaluation function becomes maximum.

A lighting area is defined as follows. A lighting device 3 to define a lighting area is placed at an origin on a three-dimensional space of a darkroom, the darkroom space is virtually split in unit distance, for example, cubes having a side of one centimeter in length, an illumination meter or a luminance meter is placed in a vertex of the split cubes to measure illumination or luminance. As the illumination meter, a general illumination meter such as a digital illumination meter EL-1000 made by TECH-JAM KK may be used. On the other hand, as the luminance meter, a general luminance meter such as a spectroradiometer SR-3 made by Tepcon Co. may be used. As an alternative to luminance measured by the luminance meters, an average luminance of images captured by video cameras and the like may be used as a luminance value.

Next, the threshold of illumination or luminance is defined. Then, to define a lighting area, an area matching the threshold of illumination or luminance is associated with the illumination or luminance measured as described above. For example, if an overlay of lighting areas among the lighting devices 3 at time t is expressed as OverlapBtwnLightAndLight(t) to represent redundancy, its reciprocal is 1/OperlapBtwnLightAndLight(t).

Assume that the lighting devices 3 are numbered, their index or number is j, a lighting area corresponding to a j-th lighting device 3 at time t is represented by SpaceofLight(t,j) and a figure area photographed by an i-th photographing device 2 at time t is represented by SpaceOfFigure(t,i). Then, a function representative of the effectiveness of lighting to a figure area in the lighting device 3 at time t can be defined as the sum total of SpaceOfLight(t,j)∩SpaceOfFigure(t,i). ∩ denotes spatial overlap. Accordingly, an evaluation function Elight(t) for deciding a method of operating lighting area information can be defined as shown by Expression 4.

a', b' and w' in Expression 4 designate coefficients, and jmax designates the total number of lighting devices 3.

$$Elight(t) = a' \frac{1}{OverlapBtwnLightAndLight(t)} + b' \sum_{i=1}^{imax} \sum_{j=1}^{jmax} w'( \quad\quad \text{[Expression 4]}$$

$$SpaceOfLight(t,\ j) \cap SpaceOfFigure(t,\ i))$$

The generating part 27 may use photographing area information inputted from the communication part 30, sound recording area information inputted from the communication part 31, conference participant related information inputted from the storage part 17, furniture information inputted from the storage part 20, and conference environment information inputted from the storage part 22 to define a different evaluation function, and may change the lighting area information based on the result. For example, based on photographing area information inputted from the communication part 30, OverlapBtwnLightAndCam(t,j,i) can be defined to represent an overlap between a lighting area of a j-th lighting device 3 and a photographing area of i-th photographing device 2 at time t.

Likewise, based on sound recording area information inputted from the communication part 31, OverlapBtwnLightAndMic(t,j,k) can be defined to represent an overlap between a lighting area of a j-th lighting device 3 and a sound recording area of a k-th sound recording device 4 at time t. A second evaluation function Elight2(t) concerning a lighting area can be defined as shown by Expression 5, using the abovementioned evaluation function Elight(t) concerning a lighting area, and the OverlapBtwnLightAndCam(t,j,i) and OverlapBtwnLightAndMic(t,j,k).

c' and d' in Expression 5 designates coefficients, i designates an index representative of i-th photographing device 2, and imax designates the total number of the photographing devices 2. k designates an index representative of k-th sound recording device 4, and kmax designates the total number of the sound recording devices 4. Like the abovementioned photographing area information generation/update Step S3, a coefficient w' can be controlled based on the contents of conference participant related information inputted from the storage part 17.

$$Elight2(t) = Elight(t) + \qquad \text{[Expression 5]}$$
$$c'\sum_{i=1}^{imax}\sum_{j=1}^{jmax} OverlapBtwnLightAndCam(t, j, i) +$$
$$d'\sum_{k=1}^{kmax}\sum_{j=1}^{jmax} OverlapBtwnLightAndMic(t, j, k)$$

For example, when the importance of conference participants in a conference such as the posts of the conference participants can be identified using so-called RFID, a personnel information database, and the like, the coefficient w' can be controlled according to the importance of the conference participants. Specifically, w' can be specified as 100 for a president, 90 for engineering executives, and 80 for section leaders. Furthermore, the generating part 27 can define an evaluation function for operating a photographing area by use of furniture information inputted from the storage part 20 and conference environment information inputted from the storage part 22.

Based on the furniture information inputted from the storage part 20, OverlapBtwnCamAndFur1(t,i,m) can be defined to represent an overlap between a lighting area of j-th lighting device 3 and a furniture area of m-th furniture at time t. Likewise, based on furniture information inputted from the storage part 20, OverlapBtwnCamAndFur2(t,j,n) can be defined to represent an overlap between a photographing area of j-th photographing device 3 and a furniture area of n-th furniture at time t.

Based on the conference environment information inputted from the storage part 22, OverlapBtwnLightAndAttention(t, j,o) can be defined to represent an overlap between a lighting area of j-th lighting device 3 at time t and o-th focused area derived from the conference environment information. A third evaluation function Elight3(t) concerning a lighting area can be defined as shown by Expression 6, using the abovementioned second evaluation function Elight2(t) concerning a lighting area and the OverlapBtwnLightAndFur1(t,j,m) as well as OverlapBtwnLightAndFur2(t,j,n) and OverlapBtwnLightAndAttention(t,j,o).

e', f', and g' designate coefficients, m designates an index representative of furniture such as m-th table, n designates an index representative of furniture such as n-th chair, o designates an index representative of o-th focused area, mmax designates the total number of pieces of furniture such as table, nmax designates the total number of pieces of furniture such as chair and omax designates the total number of areas to be focused on (referred to as focused areas) such as whiteboard and projector screen.

$$Elight3(t) = Elight2(t) + \qquad \text{[Expression 6]}$$
$$e'\sum_{m=1}^{mmax}\sum_{j=1}^{jmax} OverlapBtwnLightAndFur1(t, j, m) +$$
$$f'\sum_{n=1}^{nmax}\sum_{j=1}^{jmax} \frac{1}{OverlapBtwnLightAndFur2(t, j, n)} +$$
$$g'\sum_{o=1}^{omax}\sum_{j=1}^{jmax} OverlapBtwnLightAndAttention(t, j, o)$$

The surface of furniture such as table may be desired to be recorded as audiovisual data or video data. Such an item is expressed as OverlapBtwnLightAndFur1(t,j,m), which is part of the third evaluation function Elight(t) concerning lighting areas. On the other hand, furniture such as chairs may not be desired to be recorded as audiovisual data or video data. Such an item is expressed as the reciprocal of OverlapBtwnLightAndFur2(t,j,m), which is part of the third evaluation function Elight3(t) concerning lighting areas. These processes are primarily performed by the generating part 27.

In Step S14, according to the control of the control part 24, the driving part 32 pans and tilts a light or fluorescent lamp, and moves the lighting part 25. Thereby, the lighting area of the lighting part 25 can be controlled. In Step S15, the communication part 29 transmits lighting area information inputted from the storage part 28 to the communication parts 29 of other lighting devices 3. The communication part 29 receives lighting area information transmitted from the communication parts 29 of other lighting devices 3, and outputs it to the generating part 27. The generating part 27 generates lighting area information at the next point.

Figure 12:
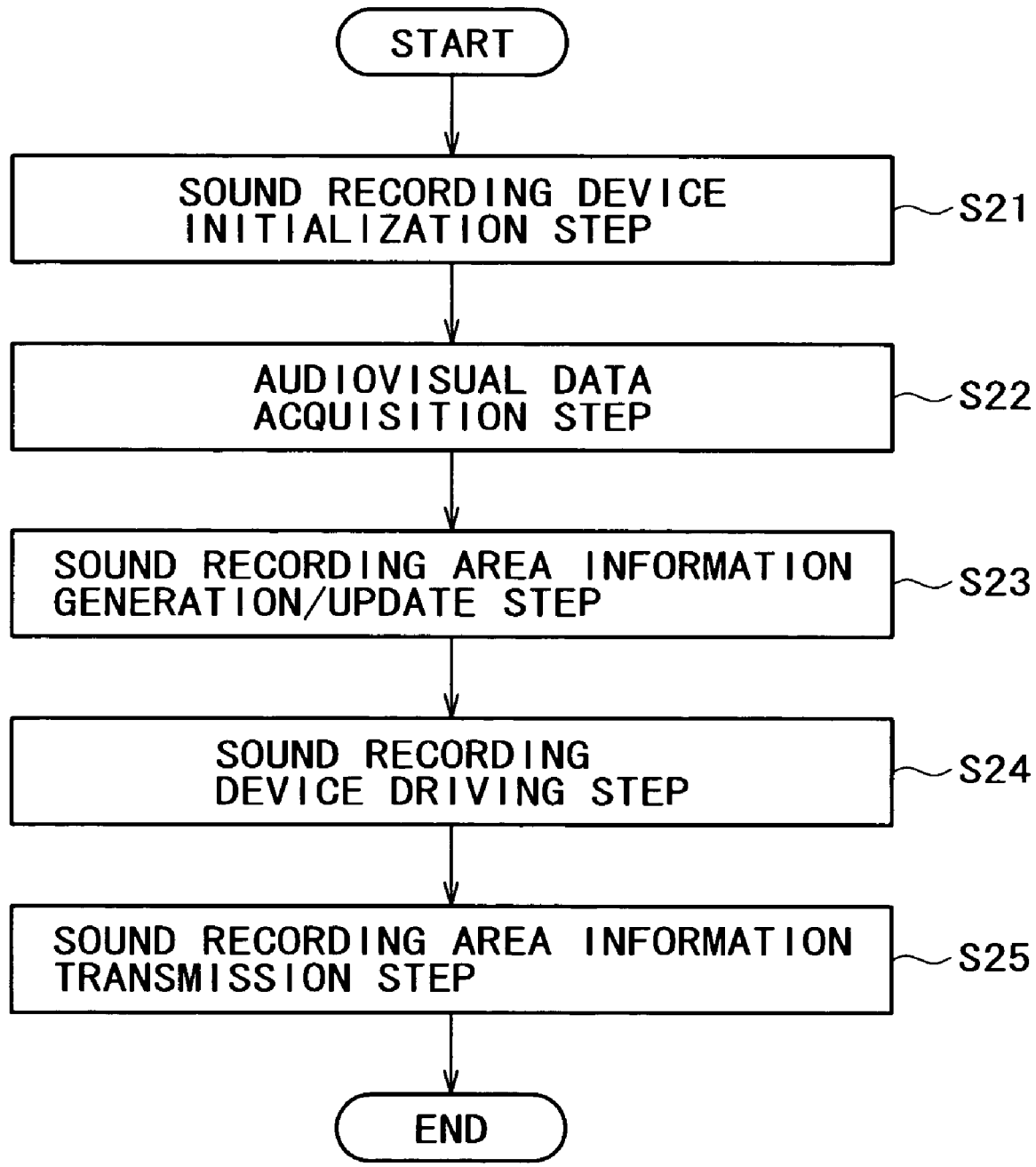
FIG. 12 is a flowchart showing a sound recording procedure in a sound recording device 4.

The following describes a sound recording procedure in the sound recording device 4. FIG. 12 is a flowchart showing a sound recording procedure in the sound recording device 4. As shown in FIG. 12, the sound recording procedure includes: sound recording device initialization Step S21; audiovisual data acquisition Step S22; sound recording area information generation/update Step S23; sound recording area information transmission Step S24; and sound recording device driving Step S25.

In Step S21, the control part 34 of the sound recording device 4 initializes parts of the sound recording device 4. In Step S22, the sound recording part 35 records audiovisual data including acoustic data such as voice uttered from conference participants and sounds generated during a conference, and outputs the recorded audiovisual data to the recording data part 36. On the other hand, the recording part 36, according to the control of the control part 34, outputs the audiovisual data to the audiovisual data presentation part 37, the communication part 38, and the audiovisual data processing part 46.

In Step S23, the generating part 40 generates new sound recording area information so that each of the sound recording devices cooperatively records audiovisual data, acoustic data, or voice data, based on sound recording area information inputted from the storage part 41, sound recording area information inputted from the communication part 42, photographing area information inputted from the communication part 43, lighting area information inputted from the communication part 44, conference participant related information inputted from the storage part 17, furniture information inputted from the storage part 20, conference environment information inputted from the storage part 22, and audiovisual data processing result inputted from the audiovisual data processing part 46. The generating part 40 stores the generated sound recording area information in the storage part 41. Thereby, the contents of the sound recording area information table 49 shown in FIG. 8 are rewritten. The sound recording area information stored in the storage part 41 is outputted to the communication part 42 according to the control of the control part 34.

The generating part 40 may extract the area where a figure is photographed based on the figure's characteristic quantities from audiovisual data captured by the photographing device 2, and may generate sound recording area information from the extracted area information. As such a method of extracting the area where a figure is photographed based on the figure's characteristic quantities, "a template to determine a figure area with a face area as reference" described in Ide et. al: "Estimating Background Scenes by Separating Figures in News Video," Paper Magazine of the Institute Electronic, Information and Communication and Engineers, D-II Vol. J84-D-II No. 8 pp. 1856-1863 August 2001 can be applied.

The following additionally describes a procedure of the generating part 40. The generating part 40 operates new sound recording area information based on initial (or the first preceding or past) sound recording area information of its own sound recording device 4 and sound recording area information of other sound recording devices 4 so that each of the sound recording devices 4 can record audiovisual data or voice data that are necessary as conference records. As a method of operating the sound recording area information, setting can be made to operate the sound recording area information so that overlap between sound recording areas of the sound recording devices 4 is maximally avoided, that is, the contents of sound data in the whole audiovisual data are least redundant.

As a method of operating the sound recording area information, setting can be made to operate the sound recording area information so that a figure area identified by the abovementioned method becomes maximum in a sound recording area of each of the sound recording devices 4. Accordingly, as an evaluation function to decide a method of operating sound recording area information, an evaluation function can be defined which includes a reciprocal of a function representative of redundancy and a function representative of a figure area in each of the sound recording devices 4. The generating part 40 can operate the sound recoding area information by use of the evaluation function so that the evaluation function becomes maximum.

A sound recording area spatially represents a directional pattern or sensitivity property of microphone. For example, if overlap between sound recording areas of the sound recording devices 4 at time t is expressed as OverlapBtwnMicAndMic(t) to represent redundancy, its reciprocal is expressed as 1/OperlapBtwnMicAndMic(t). Assume that the sound recording devices 4 are numbered, their index or number is k, a sound recording area corresponding to a k-th sound recording device 4 at time t is represented by SpaceOfMic(t,k), and a figure area photographed by the i-th photographing device 2 at time t is expressed by SpaceofFigure(t,i). Then, a function representative of the effectiveness of sound recording for the figure area in the sound recording device 4 at time t can be defined as the sum total of SpaceOfMic(t,k)∩SpaceOfFigure (t,i) ∩ denotes spatial overlap. Accordingly, an evaluation function Emic(t) for deciding a method of operating sound recording area information can be defined as shown by Expression 7.

a", b", and w" in Expression 7 designate coefficients, and kmax designates the total number of the sound recording devices 4.

$$Emic(t) = a'' \frac{1}{OverlapBtwnMicAndMic(t)} + b'' \sum_{i=1}^{imax} \sum_{k=1}^{kmax} w'' \quad \text{[Expression 7]}$$

$$(SpaceOfMic(t, k) \cap SpaceOfFigure(t, i))$$

The generating part 40 can define a different evaluation function or change lighting area information based on the result, using photographing area information inputted from the communication part 43, lighting area information inputted from the communication part 44, conference participant related information inputted from the storage part 17, furniture information inputted from the storage part 20, and conference environment information inputted from the storage part 22.

For example, based on photographing area information inputted from the communication part 43, OverlapBtwnMicAndCam(t,k,i) can be defined to represent an overlap between a sound recording area of k-th sound recording device 4 and a photographing area of i-th photographing device 2 at time t. Likewise, based on lighting area information inputted from the communication part 44, OverlapBtwnMicAndLight(t,k,j) can be defined to represent an overlap between a sound recording area of k-th sound recording device 4 and a lighting area of j-th lighting device 3 at time t.

A second evaluation function Emic2(t) concerning a sound recording area can be defined as shown by Expression 8, using the abovementioned evaluation function Emic(t) concerning a sound recording area and the OverlapBtwnMicAndCam(t,k,i) and OverlapBtwnMicAndLight(t,k,j).

c" and d" in Expression 8 designates coefficients, i designates an index representative of i-th photographing device 2, and imax designates the total number of the photographing devices 2. j designates an index representative of j-th lighting device 3, and jmax designates the total number of the lighting devices 3.

$$Emic2(t) = \quad \text{[Expression 8]}$$

$$Emic(t) + c'' \sum_{i=1}^{imax} \sum_{k=1}^{kmax} OverlapBtwnMicAndCam(t, k, i) +$$

$$d'' \sum_{j=1}^{jmax} \sum_{k=1}^{kmax} OverlapBtwnMicAndLight(t, k, j)$$

Like Steps S3 and S8, a coefficient w" in Expression 7 can be controlled based on the contents of conference participant related information inputted from the participant information input part 17. For example, when the importance of conference participants in a conference such as the posts of the conference participants can be identified using so-called RFID, a personnel information database, and the like, the coefficient w" can be controlled according to the importance of the conference participants. Specifically, w" can be specified as 100 for a president, 90 for engineering executives, and 80 for section leaders. Furthermore, the generating part 40 can define an evaluation function for operating a photographing area by use of furniture information inputted from the storage part 20 and conference environment information inputted from the storage part 22.

Based on the conference environment information inputted from the storage part 22, OverlapBtwnMicAndAttention(t,k, o) can be defined to represent an overlap between a sound recording area of k-th sound recording device 4 at time t and o-th focused area derived from the conference environment information. Based on the conference environment information inputted from the storage part 22, OverlapBtwnMicAndobstacle(t,k,o) can be defined to represent an overlap between a sound recording area of k-th sound recording device 4 at time t and p-th acoustic obstacle area derived from conference environment information.

A third evaluation function Emic3(t) concerning a sound recording area can be defined as shown by Expression 9, using the abovementioned second evaluation function Emic2(t) concerning a sound recording area and the OverlapBtwnMicAndAttention(t,k,o) and OverlapBtwnMicAndobstacle(t,k,p).

g″ and h″ designate coefficients, o designates an index representative of o-th focused area, p designates an index representative of a p-th sound obstacle area, and omax designates the total number of areas to be acoustically focused on (focused areas) such as loudspeakers. pmax designates the total number of acoustic obstacle areas such as projectors, which could be noise sources and from which sound recording should be avoided. Loudspeakers and the like may be desired to be recorded as audiovisual data or voice data. Such an item is expressed as OverlapBtwnMicAndAttention(t,k, o), which is part-of the third evaluation function Emic3(t). On the other hand, noise sources such as projectors may not be desired to be recorded as audiovisual data or audio data. Such an item is expressed as the reciprocal of OverlapBtwnMicAndObstacle(t,k,p), which is part of the third evaluation function Emic3(t) concerning a sound recording area. These processes are primarily performed by the generating part 40, the processing part 46, and the like.

$$Emic3(t) = Emic2(t) + \quad \text{[Expression 9]}$$
$$g'' \sum_{o=1}^{omax} \sum_{k=1}^{kmax} OverlapBtwnMicAndAttention(t, k, o) +$$
$$h'' \sum_{n=1}^{nmax} \sum_{k=1}^{kmax} \frac{1}{OverlapBtwnMicAndObstacle(t, k, p)}$$

Referring back to FIG. 12, in Step S24, according to the control of the control part 34, the driving part 45 controls microphone positions and angles and moves the sound recording part 35. Thereby, the sound recording range of the sound recording part 35 is controlled. In Step S25, the communication part 42 transmits sound recording area information inputted from the storage part 41 to the communication parts 42 of other sound recording devices 4. The communication part 42 receives sound recording area information transmitted from the communication parts 42 of other sound recording devices 4, and outputs it to the generating part 40. The generating part 27 generates sound recording area information at the next point.

Figure 13:
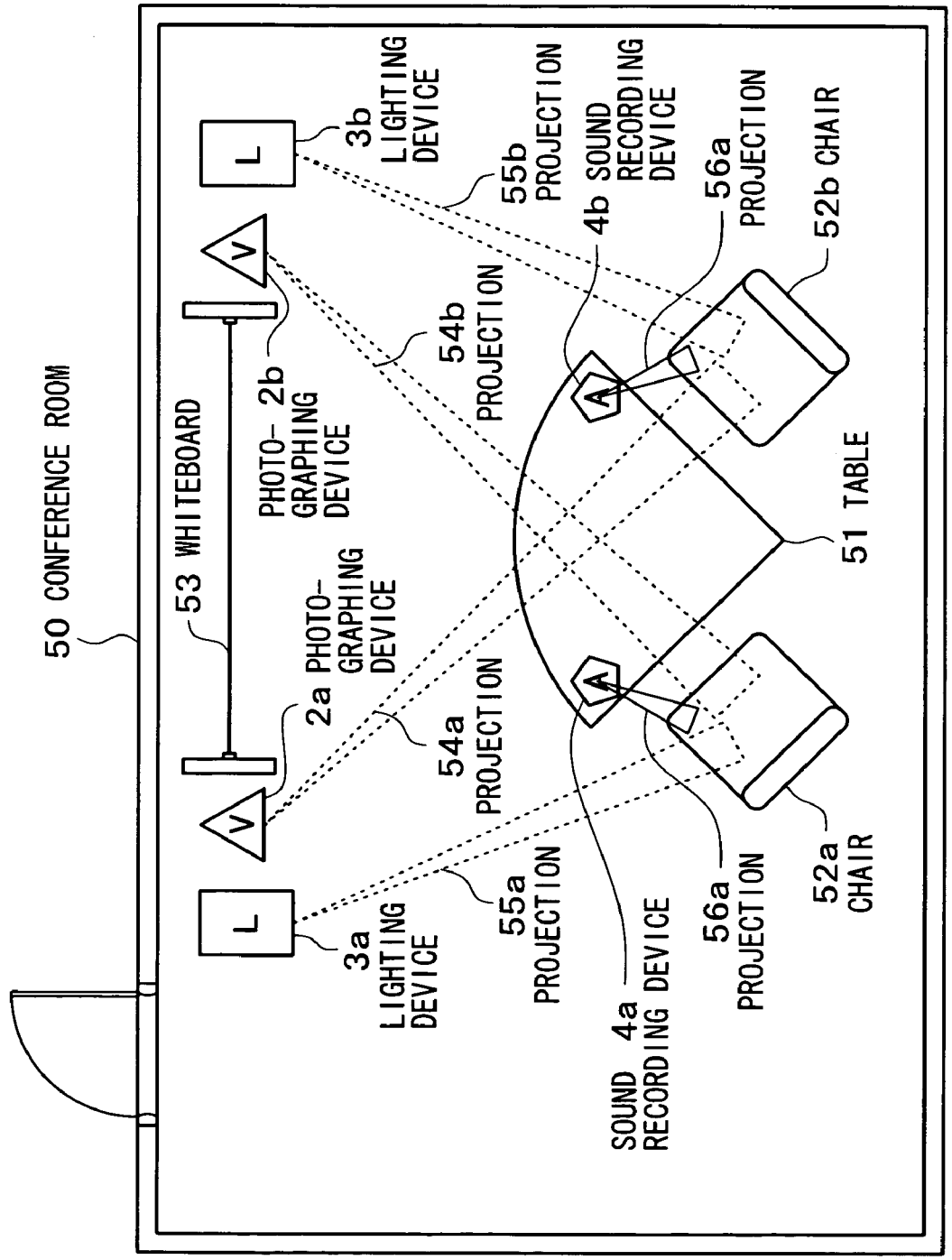
FIG. 13 is a plan view showing an example of a conference room according to conference recording of the present invention.

FIG. 13 is a plan view showing an example of a conference room according to conference recording of the present invention. The conference room 50 is equipped with a conference table 51, chairs 52a and 52b, and a whiteboard 53. The conference room 50 is also equipped with two photographing devices 2a and 2b, two lighting devices 3a and two 3b, and two sound recording device 4a and 4b.

In processing for photographing area information of the generating part 11 in Step S3, the generating part 11 of the photographing devices can generate photographing area information to photograph different spaces on a three-dimensional space. For example, the photographing devices 2a and 2b in FIG. 13 respectively generate photographing area information so as to photograph areas corresponding to projections 54a and 54b to planes of cones corresponding to solid angles.

Likewise, in processing for lighting area information of the generating part 27 in Step S13, the generating part 27 of the lighting devices generates lighting area information to light different spaces on the three-dimensional space. For example, the lighting devices 3a and 3b in FIG. 13 respectively generate photographing area information so as to light areas corresponding to projections 55a and 55b to planes of cones corresponding to solid angles.

Likewise, in processing for sound recording area information of the generating part 40 in Step S23, the generating part 40 of the sound recording devices generates sound recording area information to record audiovisual data generated on different spaces on the three-dimensional space. For example, the sound recording devices 4a and 4b in FIG. 13 respectively generate sound recording area information to record audiovisual data from areas corresponding to projections 56a and 56b to planes of cones corresponding to solid angles.

The following describes a method of time-based control of the photographing devices 2, the lighting devices 3, and the sound recording devices 4. As shown by the photographing area information table 47 of FIG. 6, as the photographing devices 2, three photographing devices 2 are respectively identified as CAM0, CAM1, and CAM2 by the photographing device identifier 47a. As shown by the lighting area information table 48 of FIG. 7, as the lighting devices 3, two lighting devices 3 are respectively identified as LIGHT0 and LIGHT1 by the lighting device identifier 48a. As shown by the sound recording area information table 49 of FIG. 8, as the sound recording devices 4, two sound recording devices 4 are respectively identified as MIC0 and MIC1 by the sound recording device identifier 49a.

Figure 14:
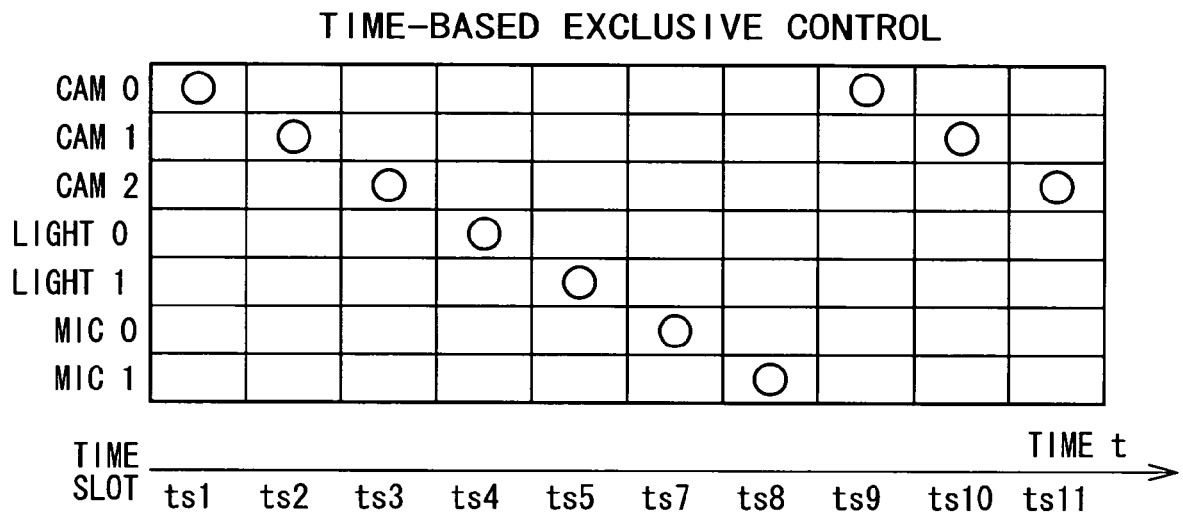
FIG. 14 is a drawing showing a relationship between time slots and the allocation of the time slots to devices for control.

FIG. 14 is a drawing showing a relationship between time slots and the allocation of the time slots to devices for control. In control of the photographing devices 2, the lighting devices 3, and the sound recording devices 4, time is divided as time slots in a prescribed unit, e.g., every 100 milliseconds split, and the time slots are identified as ts1, ts2, ts3, . . . , ts11 as shown in FIG. 14. The photographing devices 2, the lighting devices 3, and the sound recording devices 4 are controlled exclusively in terms of time with the time slots as a unit. Specifically, in time slot ts1, while control or state change such as panning and tilting is in progress with respect to the photographing device 2 of CAM0, the states of other photographing devices 2 of CAM1 and CAM2, the lighting devices 3, and the sound recording devices 4 are fixed.

In time slot ts2 that follows, while control or state change such as panning and tilting is in progress with respect to the photographing device 2 of CAM1, the states of other photographing devices 2 of CAM0 and CAM2, the lighting devices 3, and the sound recording devices 4 are fixed. Subsequently, in the same way, each time slot is allocated to the photographing devices 2, the lighting devices 3, and the sound recording devices 4 to perform exclusive control in terms of time.

The photographing device 2, in the photographing area information transmission Step S5, updates photographing area information such as the time corresponding to the time slot in which the photographing device 2 was controlled, and transmits the photographing area information to other photographing devices 2 and the like. Likewise, the lighting device 3, in Step S15, updates lighting area information such as the time corresponding to the time slot in which the lighting device 3 was controlled, and transmits the lighting area information to other lighting devices 3 and the like. Likewise, the sound recording device 4, in Step S25, updates sound recording area information such as the time corresponding to the time slot in which the sound recording device 4 was controlled, and transmits the sound recording area information to other sound recording devices 4 and the like. Thereby, the photographing devices 2, the lighting devices 3, and the sound recording devices 4 can be controlled exclusively in terms of time.

In the first embodiment, the control parts 5, 24, and 34 are provided for each of the photographing devices 2, each of the lighting devices 3, and each of the sound recording devices 4, respectively. However, one control part may be provided for the conference recording device 1 to control all the photographing devices 2, the lighting devices 3, and the sound recording devices 4. Also, in the first embodiment, the generating parts 11, 27, and 40 are provided for each of the photographing devices 2, each of the lighting devices 3, and each of the sound recording devices 4, respectively. However, one generating part may be provided for the conference recording device 1 to all of photographing area information, lighting area information, and sound recording area information.

Second Embodiment

Figure 15:
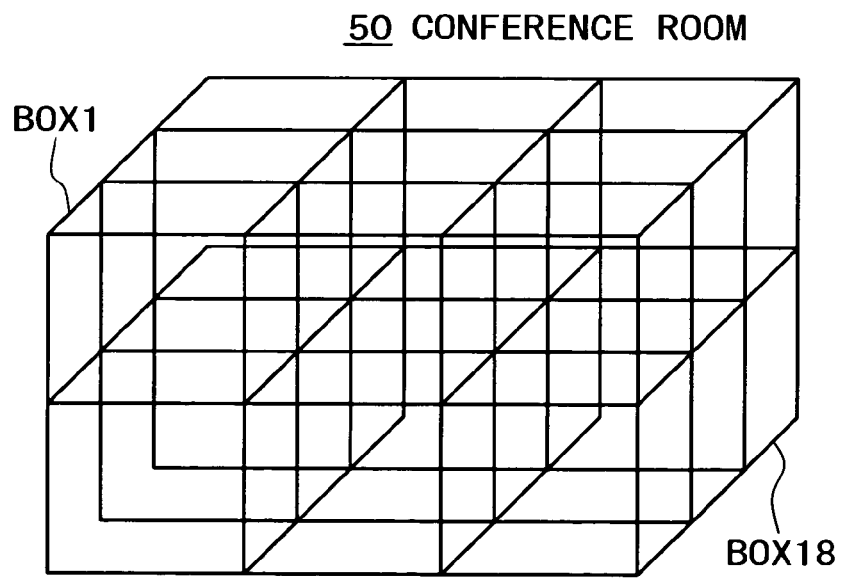
FIG. 15 is a drawing showing a conference room 50 divided by cubes.

The following describes a second embodiment. A photographing area of the photographing device 2, a lighting area of the lighting device 3, and a sound recording area of the sound recording device 4 are modeled in cubes, and the photographing device 2, the lighting device 3, and the sound recording device 4 are controlled by use of the model of the cubes. A conference room, as shown in FIG. 15, is divided by cubes having a side of a prescribed unit length. For example, a conference room 50 is divided by 18 cubes as shown in FIG. 15. FIG. 15 is a drawing showing the conference room 50 divided by cubes. Next, an identifier is assigned to each of the divided cubes. For example, the individual cubes are defined by identifiers of BOX1 to BOX18, respectively. Then, the photographing device 2, the lighting device 3, and the sound recording device 4 are assigned as a photographing area, a lighting area, or a sound recording area that cover different cubes different from each other.

By thus modeling or representing the conference room 50 as divided cubes and assigning a corresponding photographing area, a lighting area, and a sound recording area, plural photographing devices 2, lighting devices 3, and sound recording devices 4 can be spatially exclusively controlled. Photographing areas of the photographing devices 2, lighting areas of the lighting devices 3, and sound recording areas of the sound recording devices 4 are modeled or represented in fan shape or triangularly on a plan view when the conference room is overlooked from above so that plural photographing devices 2, lighting devices 3, and sound recording devices 4 can be controlled.

Figure 16:
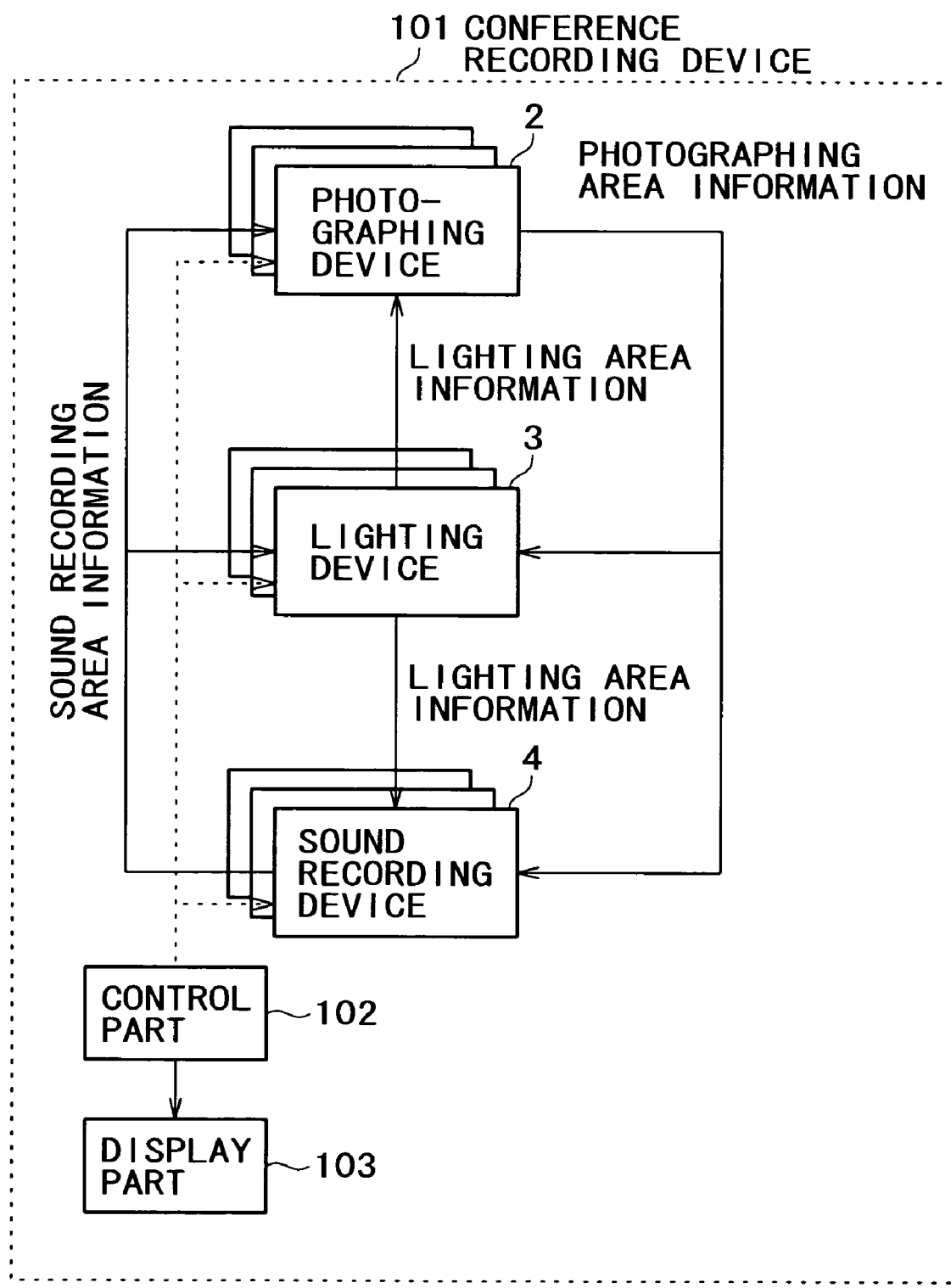
FIG. 16 is a block diagram showing a conference recording device 101 according to a second embodiment.

FIG. 16 is a block diagram showing a conference recording device 101 according to the second embodiment. The conference recording device 101 models or represents photographing areas of photographing devices 2, lighting areas of lighting devices 3, and sound recording areas of sound recording devices 4 in fan shape to control the plural photographing devices 2, lighting devices 3, and sound recording devices 4.

As shown in FIG. 16, the conference recording device 101 includes plural photographing devices 2, plural lighting devices 3, plural sound recording devices 4, a control part 102, and a display part 103. Since the photographing devices 2, the lighting devices 3, and the sound recording devices 4 have the same configuration as those in the first embodiment, descriptions of them are omitted here.

The control part 102 displays a graphical user interface in the display part 103. The graphical user interface is used to model or represent photographing areas of photographing devices 2, lighting areas of lighting devices 3, and sound recording areas of sound recording devices 4 in fan shape to control the plural photographing devices 2, lighting devices 3, and sound recording devices 4. The control part 102 includes a CPU and the like.

Figure 17:
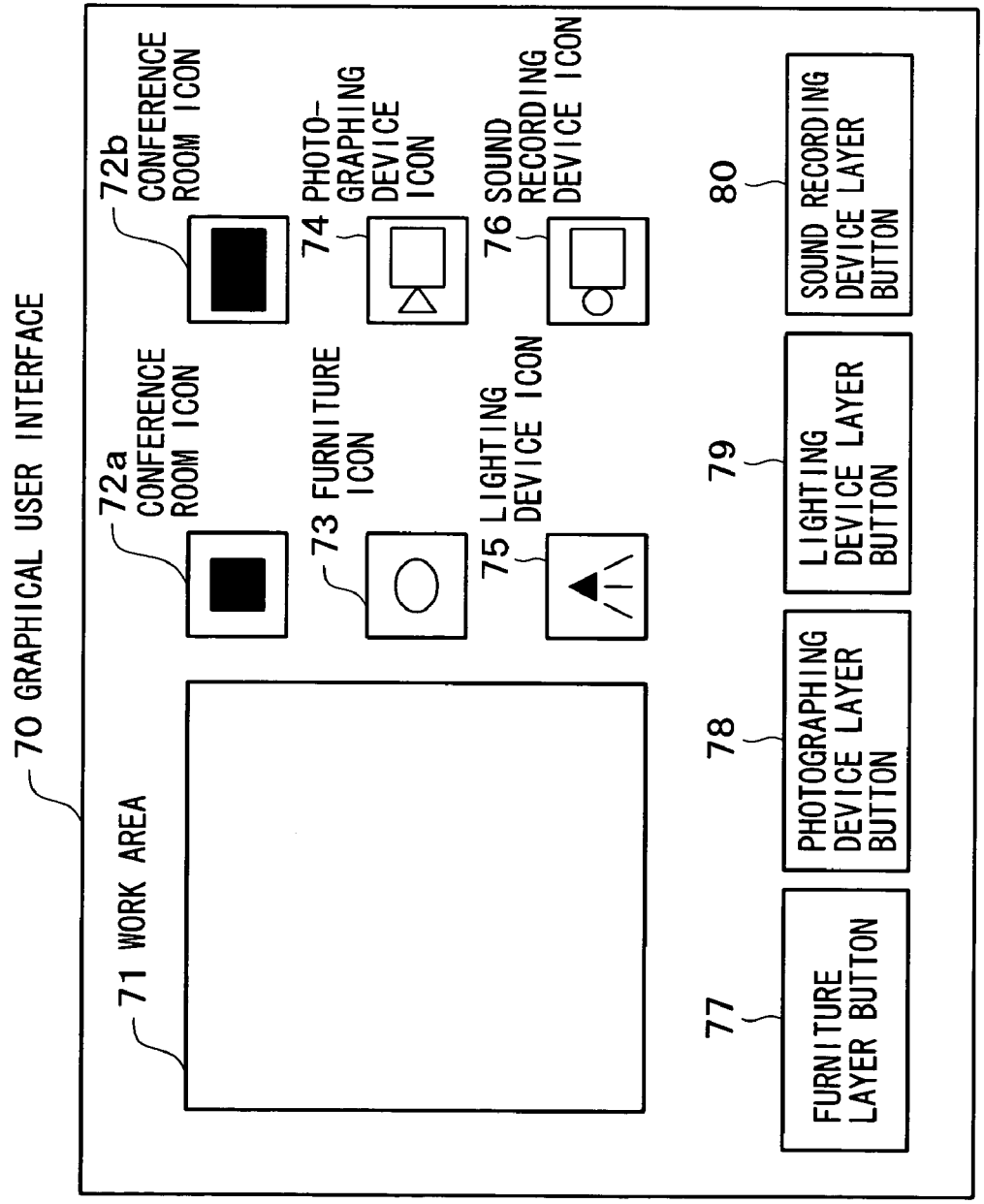
FIG. 17 is a drawing showing the graphical user interface 70.

FIG. 17 shows the graphical user interface 70. The display part 103 displays the graphical user interface 70. As shown in FIG. 17, the graphical user interface 70 includes a work area 71, a conference room icon 72*a*, a conference room icon 72*b*, a furniture icon 73, a photographing device icon 74, a lighting device icon 75, a sound recording device icon 76, a furniture layer button 77, a photographing device layer button 78, a lighting device layer button 79, and a sound recording device layer button 80.

The conference room icons 72*a* and 72*b* set the conference room. The furniture icon 73 sets furniture. The photographing device icon 74 sets the photographing devices. The lighting device icon 75 sets the lighting devices. The sound recording device icon 76 sets the sound recording devices. The work area 71 is an area for performing operations by dragging and dropping these icons. The work area represents the icons on a two-dimensional or three-dimensional space.

Figure 18:
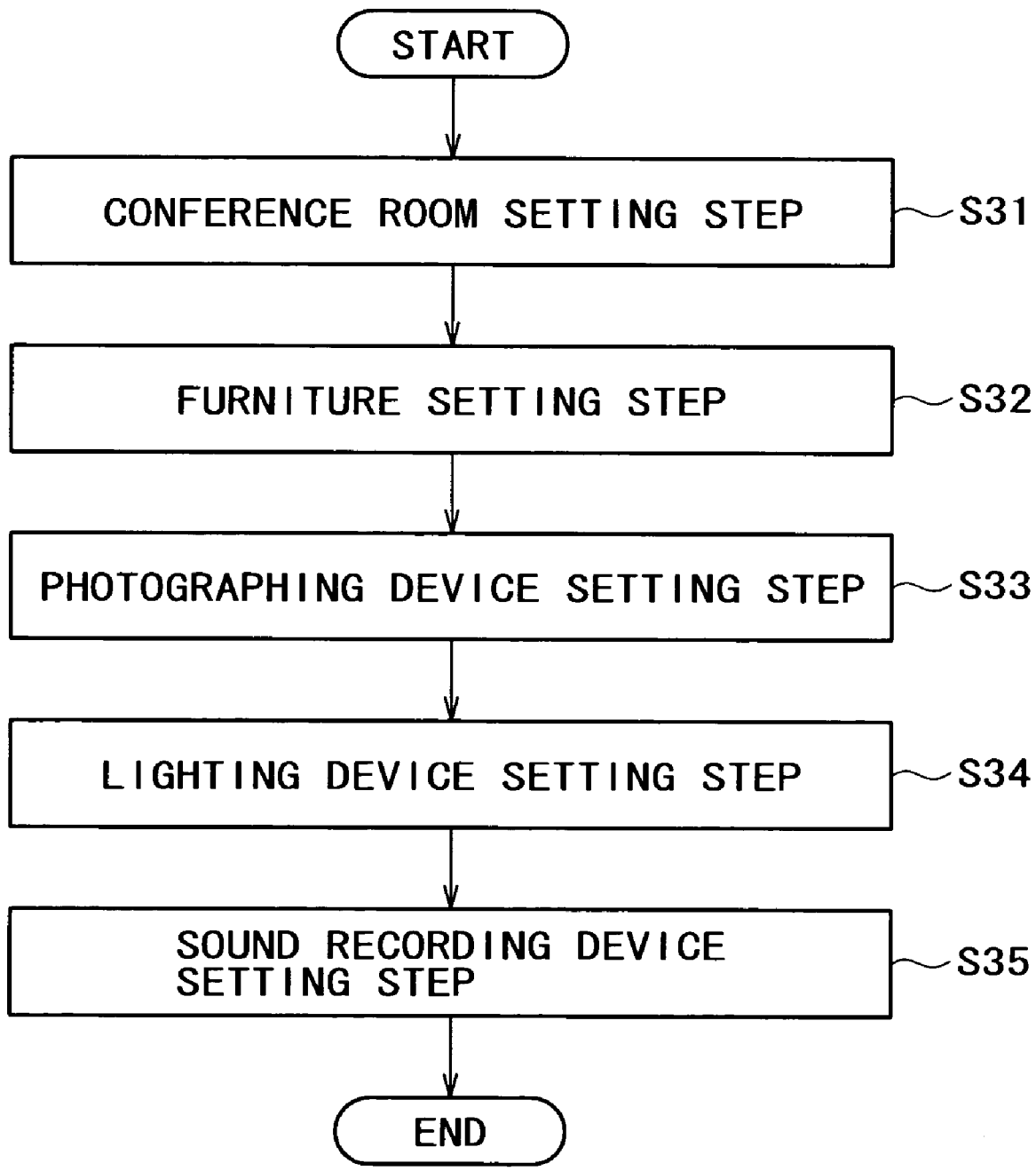
FIG. 18 is a drawing showing a procedure to use the graphical user interface.

FIG. 18 shows a procedure to use the graphical user interface. The procedure to use the graphical user interface 70, as shown in FIG. 18, includes conference room setting Step S31, furniture setting Step S32, photographing device setting Step S33, lighting device setting Step S34, and sound recording device setting Step S35. In Step S31, the user sets the conference room by placing the conference room icon 72*a* or conference room icon 72*b* of the graphical user interface 70 in the work area 71 by a so-called drag-and-drop operation. The conference room icon 72*a* and the conference room icon 72*b* represent the place, shape, and size of the conference room. The number of the conference room icons is not limited to two; as many conference room icons as needed may be placed on the graphical user interface 70.

In Step S32, the user selects the furniture layer button 77 and places the furniture icon 73 in the work area 71 by a drag-and-drop operation. The work area includes a conference room layer, which is a reference layer, a furniture layer, a photographing device layer, a lighting device layer, and a sound recording device layer. These layers are transparent. The conference room layer is a default layer. By selecting the furniture layer button 77, the user can place the furniture icon 73 on the furniture layer. The user can pictorially identify a table, chairs, and the like by setting the attributes of the furniture icon 73. By setting the attributes of the furniture icon 73 by use of a menu, a dialog, and the like, the user can set the size, shape, color, and the like of the furniture in the work area 71. The user can place as many furniture icons 73 as needed in the work area 71 by a drag-and-drop operation.

In Step S33, the user selects the photographing device layer button 78 and places the photographing device icon 74 in the work area 71 by a drag-and-drop operation. By selecting the photographing device layer button 78, the user can place the photographing device icon 74 on the photographing device layer. Furthermore, as shown in FIG. 19, the user can set a photographing area by operating a fan-shaped attribute icon 81 representative of a photographing area.

Figure 19:
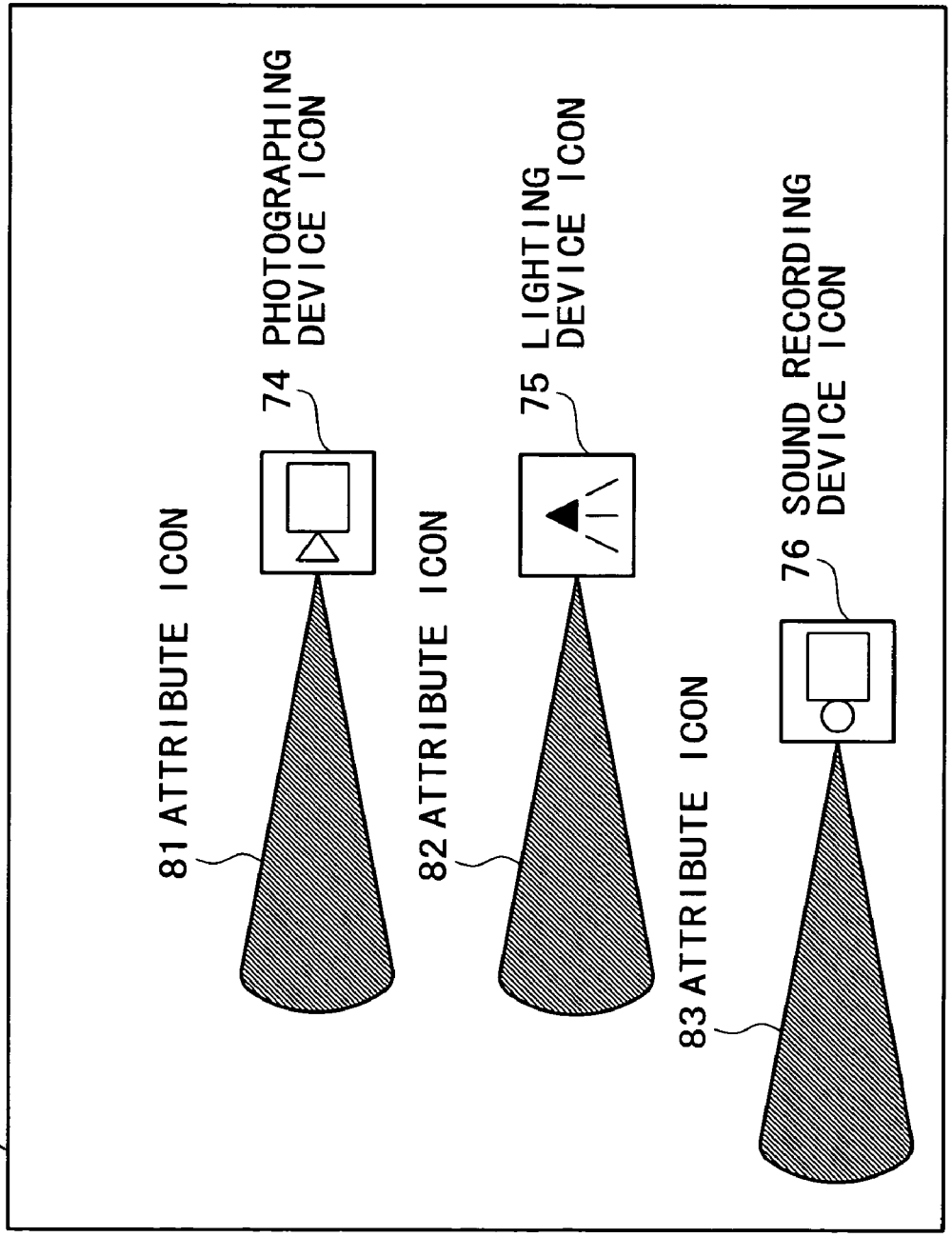
FIG. 19 is a drawing showing a work screen in a work area.

FIG. 19 is a drawing showing a work screen in the work area. The user can place as many photographing icons 74 as needed in the work area 71 by a drag-and-drop operation. In Step S34, the user selects the lighting device layer button 79 and places the lighting device icon 75 in the work area 71 by a drag-and-drop operation. By selecting the lighting device layer button 79, the user can place the lighting device icon 79 on the lighting device layer. Furthermore as shown in FIG. 19, the user can set a lighting area by operating fan-shaped attribute icon 82 representative of a lighting area. The user can place as many lighting device icons 75 as needed in the work area 71 by a drag-and-drop operation.

In Step S35, the user selects the sound recording device layer button 80 and places the sound recording device icon 76 in the work area 71 by a drag-and-drop operation. By selecting the sound recording device layer button 80, the user can place the sound recording device icon 76 on the sound recording device layer. Furthermore, as shown in FIG. 19, the user can set a sound recording area by operating a fan-shaped attribute icon 83 representative of a sound recording area. The user can place as many sound recording device icons 76 as needed in the work area 71 by a drag-and-drop operation.

The control part 102 sends information inputted through the graphical user interface 70 to the photographing devices 2, the lighting devices 3, and the sound recording devices 4. The photographing devices 2, the lighting devices 3, and the sound recording devices 4 accept information inputted through the graphical user interface 70 through the photographing area information input part 10, the participant information input part 16, the furniture information input part 19, the environment information input part 21, the lighting area information input part 26, and the sound recording area information input part 39, which are shown in FIGS. 2 to 4. The respective generating parts 11, 27, and 40 of the photographing device 2, the lighting device 3, and the sound recording devices 4 generate the abovementioned photographing area information, lighting area information, and sound recording area information according to information inputted from the control part 102. Thereby, the photographing devices 2, the lighting devices 3, and the sound recording devices 4 can be controlled according to operations on the graphical user interface 70.

Information set by use of the graphical user interface 70 as described above is recorded as a conference record setting file. The conference record setting file can be reused for reference during preparation for a next conference. Photographing areas of the photographing devices 2, lighting areas of the lighting devices 3, and sound recording areas of the sound recording devices 4 can be modeled or represented as three-dimensional solids such as cones to control the plural photographing devices 2, lighting devices 3, and sound recording devices 4.

Figure 20:
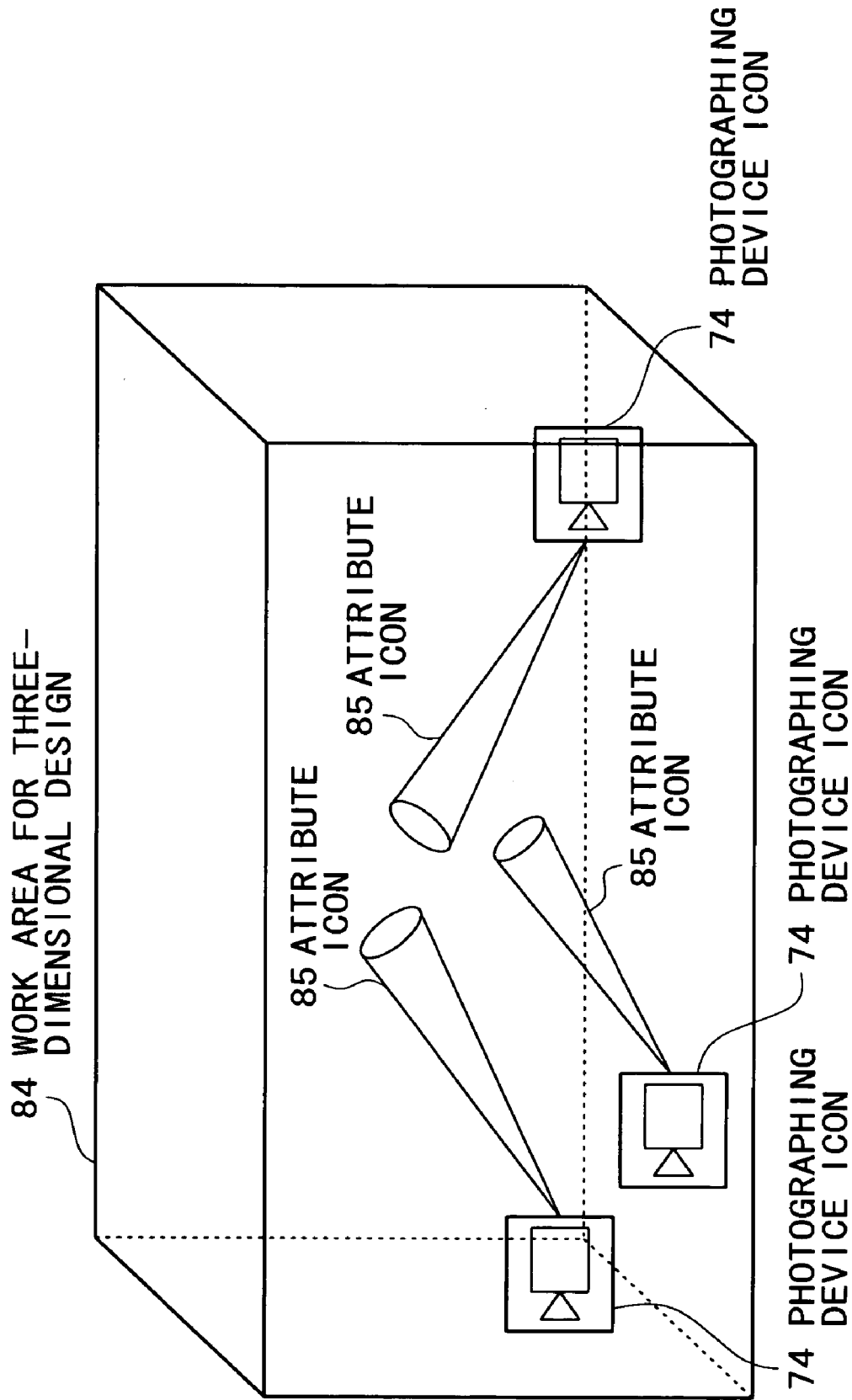
FIG. 20 is a drawing showing a work screen in a work area for three-dimensional design.

FIG. 20 shows a work screen in a work area for three-dimensional design. Instead of control by specification of two-dimensional attribute icons in the two-dimensional work area 71 as described previously, the user can control the plural photographing devices 2, lighting devices 3, and sound recording devices 4 by use of a three-dimensional design work area 84 in which three-dimensional photographing areas, lighting areas, and sound recording areas as shown in FIG. 20 can be allocated, and placing attribute icons 85 showing three-dimensional photographing areas, lighting areas or sound recording areas represented as cones.

In FIG. 20, the user places three photographing device icons 74 in the three-dimensional design work area 84, and respectively assigns attribute icons 85 to photographing devices 2 corresponding to the photographing device icons 74, thereby setting photographing areas. Thereby, the photographing devices 2 corresponding to the photographing device icons 74 can be controlled. Although not shown in the drawing, in the same way, the user places lighting icons in the three-dimensional design work area 84, and respectively assigns attribute icons to lighting devices 3 corresponding to the lighting device icons, thereby setting lighting areas. Thereby, the lighting devices 3 corresponding to the lighting device icons can be controlled.

In the same way, the user places sound recording icons in the three-dimensional design work area 84, and respectively assigns attribute icons to sound recording devices 4 corresponding to the sound recording icons, thereby setting sound recording areas. Thereby, the sound recording devices 4 corresponding to the sound recording device icons can be controlled.

Third Embodiment

Figure 21:
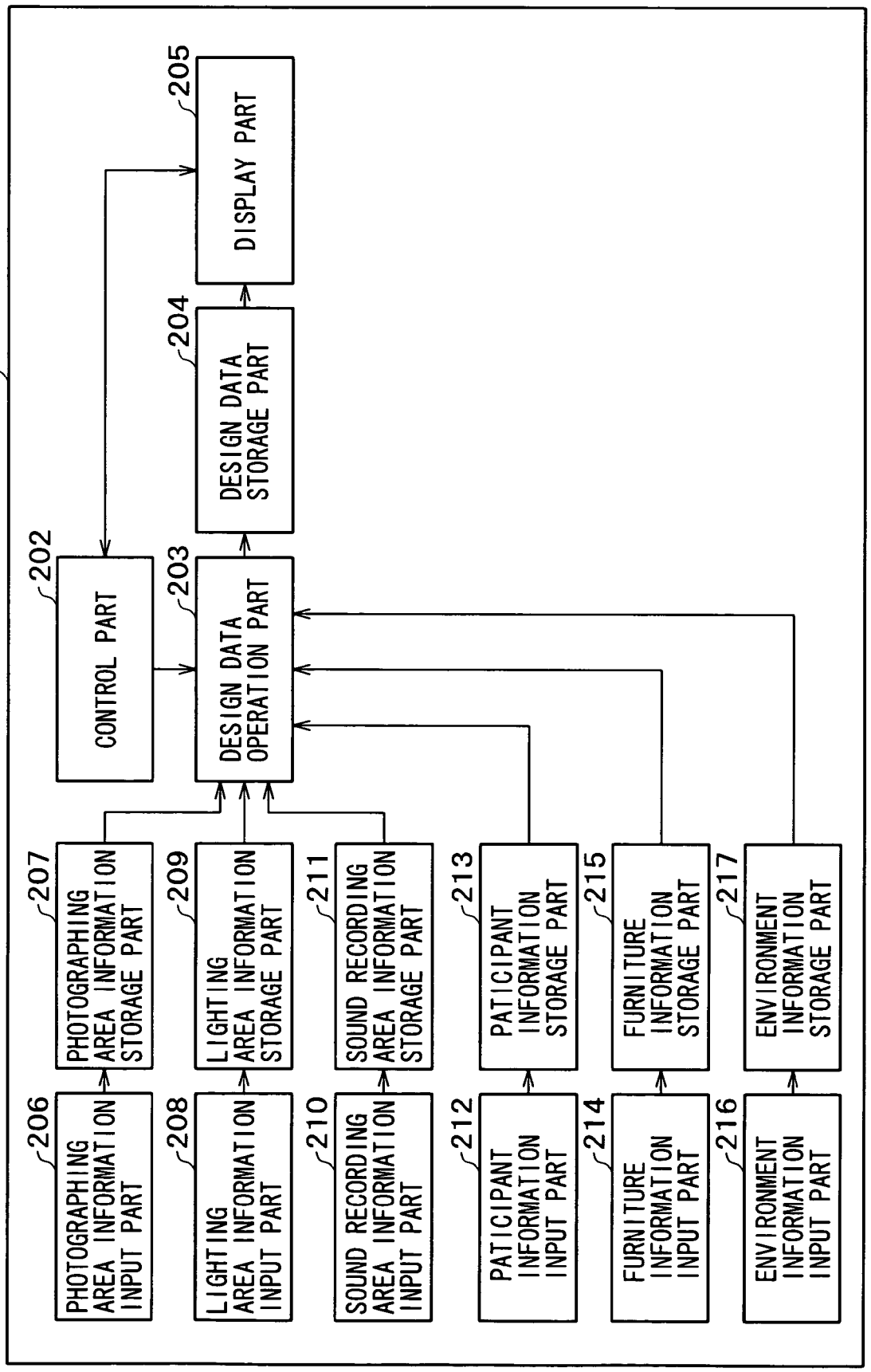
FIG. 21 is a block diagram showing an example of a design device of a third embodiment.

The following describes a third embodiment. The following describes a design device according to the third embodiment. FIG. 21 is a block diagram showing an example of the design device of the third embodiment. A design device 201 includes a control part 202, an operation part 203, a design data storage part 204, a display part 205, a photographing area information input part 206, a photographing area information storage part 207, a lighting area information input 208, a lighting area information storage part 209, a sound recording area information input part 210, a sound recording area information storage part 211, a participant information input part 212, a participant information storage part 213, a furniture information input part 214, a furniture information storage part 215, an environment information input part 216, and an environment information storage part 217.

The design device 201 designs design objects such as furniture including a conference room, a whiteboard, a table, a chair, and a projection screen. The control part 202 controls the whole design device 201. The control part 202 displays a graphical user interface for designing design objects such as furniture including a conference room, a whiteboard, a table, a chair, and a projection screen in the display part 205. The display part 205 displays the graphical user interface for designing design objects and the designed design objects.

Figure 22:
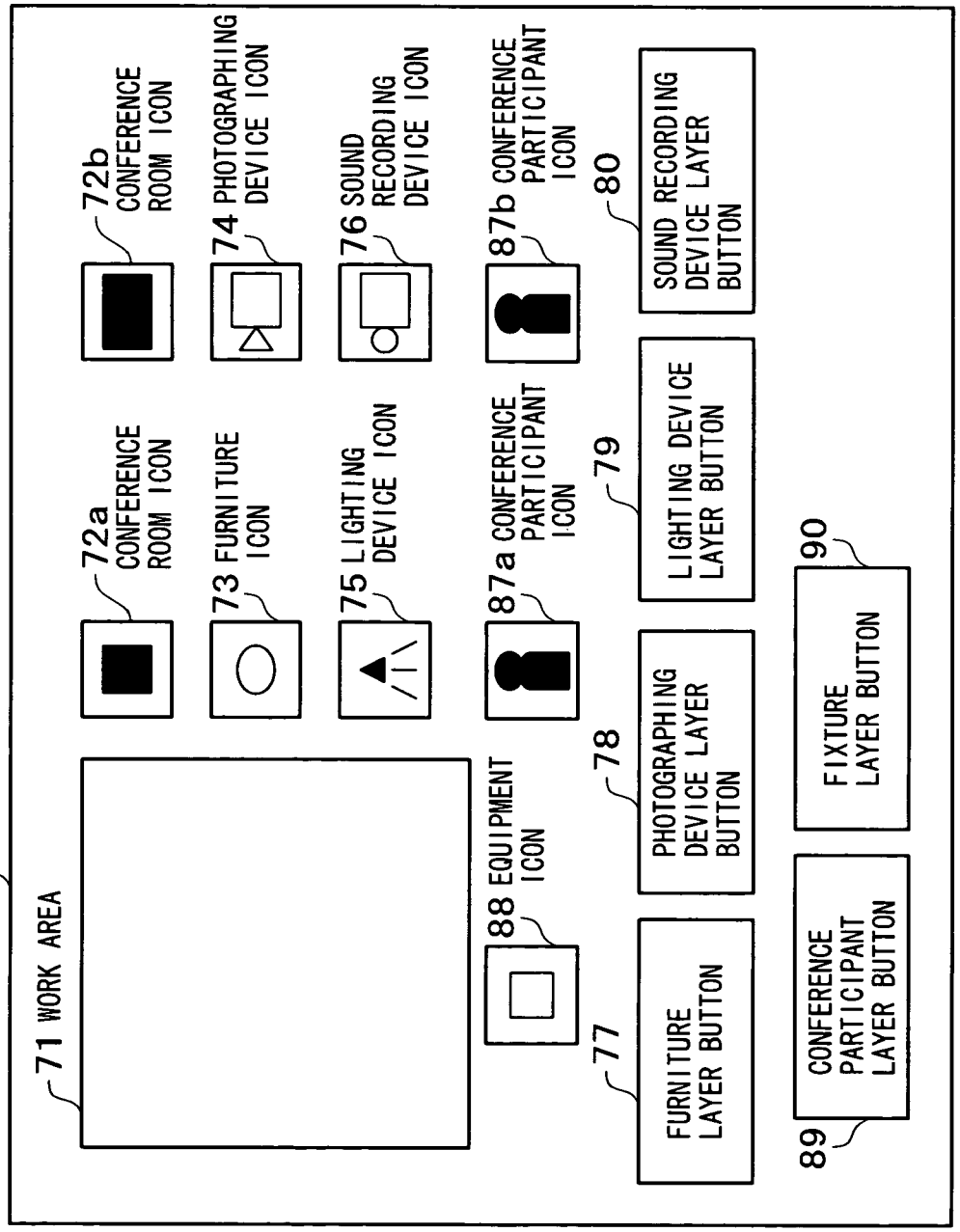
FIG. 22 is a drawing showing a display example of a graphical user interface 86.

FIG. 22 shows a display example of the graphical user interface 86. The graphical user interface 86 functions as the photographing area information input part 206, the lighting area information part 208, the sound recording area information input part 210, the participant information input part 212, the furniture information input part 214, and the environment information input part 216. These input parts may also be provided with a keyboard or the like in addition to the graphical user interface 86. Information inputted from the input parts is respectively stored in the photographing area information storage part 207, the lighting area information storage part 209, the sound recording area information storage part 211, the participant information storage part 213, the furniture information storage part 215, and the environment information storage part 217.

The operation part 203 designs a design object based on photographing area information inputted from the storage part 207, lighting area information inputted from the storage part 209, sound recording area information inputted from the storage part 211, conference participant related information inputted from the storage part 213, furniture information inputted from the storage part 215, and conference environment information inputted from the storage part 217. The data of the designed design object is stored in the storage part 204. The display part 205 displays the design data inputted from the storage part 204 to a user. The display part 61 includes a common display and the like.

The following describes how table design data is designed from the photographing area information and the participant related information. FIG. 22 is an example of the graphical user interface used when the table is designed. As shown in FIG. 22, the graphical user interface 86 includes a work area 71, conference room icons 72a and 72b, a furniture icon 73, a photographing device icon 74, a lighting device icon 75, a sound recording device icon 76, a furniture layer button 77, a photographing layer button 78, a lighting device layer button 79, a sound recording device layer button 80, conference participant icons 87a and 87b, an equipment icon 88, a conference participant layer button 89, and an equipment layer button 90.

To the graphical interface 70 described in the second embodiment, the conference participant icons 87a and 87b, the equipment icon 88, the conference participant layer button 89, and the equipment layer button 90 are added. The user places the conference room icons 72a and 72b, the furniture icon 73, the photographing device icon 74, the lighting device icon 75, the sound recording device icon 76, the conference participant icons 87a and 87b, and the furniture icon 88 in the work area 71 of the graphical user interface 86. Then, by setting attributes related to these icons, the user can design table design data.

The work area 71 in the graphical user interface 86 includes a conference room layer, which is a reference layer or a default layer, a photographing device layer, a lighting device layer, a sound recording device layer, a conference participant layer, and an equipment layer. These layers can be made transparent.

Figure 23:
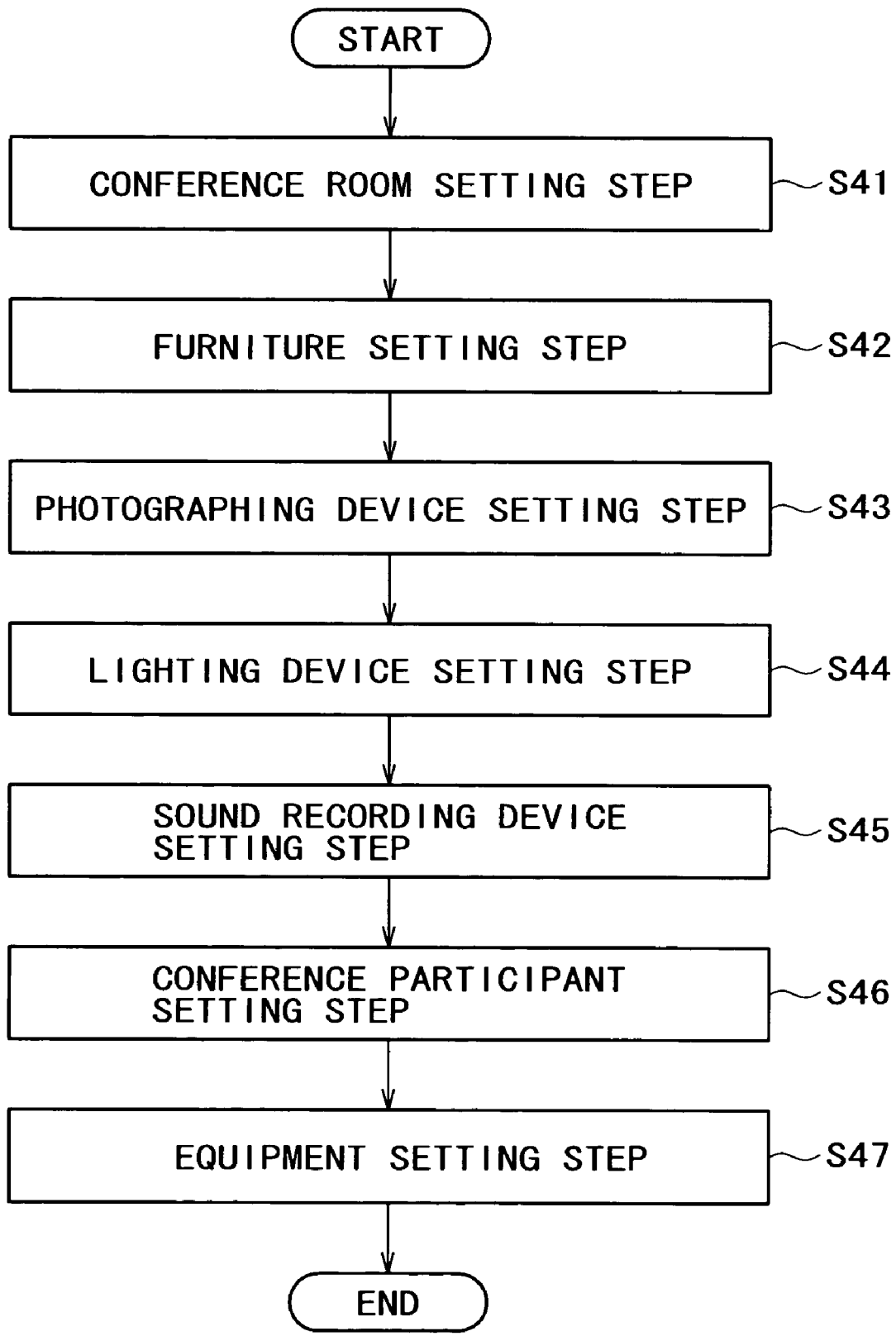
FIG. 23 is a flowchart showing the procedure to use a graphical user interface.

The following describes a procedure to set table design data from the photographing area information and the like through the graphical user interface 86. FIG. 23 is a flowchart showing a procedure to use the graphical user interface. The procedure to use the graphical user interface 86 includes a conference room setting step S41, a furniture setting step S42, a photographing device setting step S43, a lighting device setting step S44, a sound recording setting step S45, a conference participant setting step S46, and an equipment setting step S47.

FIG. 23, which is a flowchart showing the procedure of the graphical user interface 86, is different from FIG. 18, which is a flowchart showing the same procedure, in that a conference participant setting step S46 and an equipment setting step S47 are added. Here, Step 42 sets only a chair as furniture.

In Step S41, the user places the conference room icon 72a or the conference room icon 72b of the graphical user interface 86 in the work area 71 by a so-called drag-and-drop operation. Here, the conference room icons 72a and 72b represent the place, shape, and size of a conference room. The number of the conference room icons that may be placed on the graphical user interface 86 is not limited to two but may be any number required. Information about a conference room inputted from the graphical user interface 86 is stored in the storage part 217 from the environment information input part 216. From the environment information input part 216, the following conference environment information can be inputted: the size, shape, and color of a place where a conference is held, the reflection factor of electromagnetic wave such as visible light and sound wave, and afforddance of furniture.

In Step S42, the user selects the furniture layer button 77, and places the furniture icon 73 in the work area 71 by a drag-and-drop operation. Here, the work area includes the conference room layer, which is a reference layer, the furniture layer, the photographing device layer, the lighting device layer, and the sound recording device layer. These layers are transparent. The conference room layer is a default layer. By selecting the furniture layer button 77, the user can place the furniture icon 73 on the furniture layer. The user can graphically identify a table, a chair, the like by setting the attribute of furniture icon 73.

By setting the attribute of the furniture icon 73 using a menu, a dialog, and the like, the user can set the size, shape, and color of furniture in the workspace 71. The user can place as many furniture icons 73 as needed in the work area 71 by drag-and-drop operations. Furniture Information inputted from the graphical user interface 86 is stored in the storage part 215 from the furniture information input part 214.

In Step S43, the user selects the photographing device layer button 78 and places the photographing device icon 74 in the work area 71 by a drag-and-drop operation. By selecting the photographing device layer button 74, the user can place the photographing device icon 74 on the photographing device layer. Furthermore, as shown in FIG. 19, the user can set a photographing area by operating the fan-shaped attribute icon 81 representative of the photographing area.

The user can place as many photographing device icons 74 as needed in the work area 71 by drag-and-drop operations. Photographing device or photographing area information inputted from the graphical user interface 86 is stored in the storage part 207 from the photographing area information input part 206.

In Step S44, the user selects the lighting device layer button 79 and places the lighting device icon 75 in the work area 71 by a drag-and-drop operation. By selecting the lighting device layer button 79, the user can place the lighting device icon 75 on the lighting device layer. Furthermore, as shown in FIG. 19, the user can set the lighting area by operating the fan-shaped attribute icon 82 representative of the lighting area. The user can place as many lighting device icons 75 as needed in the work area 71 by drag-and-drop operations. Lighting device or lighting area information inputted from the graphical user interface 86 is stored in the storage part 209 from the lighting area information input part 210.

In Step S45, the user selects the sound recording device layer button 80 and places the sound recording device icon 76 in the work area 71 by a drag-and-drop operation. By selecting the sound recording device layer button 80, the user can place the sound recording device icon 76 on the sound recording device layer. Sound recording device or sound recording area information inputted from the graphical user interface 86 is stored in the storage part 211 from the sound recording area information input part 210.

In Step S46, the user can set information about conference participants by placing the conference participant icons 87a and 87b in the work area 71 of the graphical user interface 86. The user can set the conference participant icons 87a and 87b on the conference participant layer of the work area 71 by selecting the conference participant layer button 89. The user can place as many conference participant icons as conference participants in the work area 71. Here, the number of conference participants is two and the conference participant icons 87a and 87b are placed in the work area 71.

As attributes of the conference participants, the user can set conference participant related information such as the positions of the conference participants, a view range of the conference participants, the postures of the conference participants, a visible and audible range of the conference participants, a movable range of the conference participants by use of the attribute icon. The participant information inputted from the graphical user interface 86 is stored in the storage part 213 from the participant information input part 212.

In Step S47, the user can set equipment information by placing the equipment icon 88 in the work area 71 of the graphical user interface 86. The user can set the equipment icon 88 on the equipment layer of the work area 71 by selecting the equipment layer button 90. The user can place as many equipment icons 88 as needed in the work area 71 to set whiteboard, projector, projector screen, and other furniture items. The equipment information inputted from the graphical user interface 86 is stored in the storage part 217 from the environment information input part 216.

The operation part 203 designs, under the control of the control part 202, a table of a design object, based on photographing area information inputted from the storage part 207, lighting area information inputted from the storage part 209, sound recording area information inputted from the storage part 211, conference participant related information inputted from the storage part 213, equipment information inputted from the storage part 215, and conference environment information inputted from the storage part 217. The data of the designed design object is stored in the storage part 204. The display part 205 displays the design data inputted from the storage part 204 to the user.

As a result of executing the procedure to use the abovementioned graphical user interface, assume that the chair 52a and 52b, the photographing device 2a and 2b, the lighting devices 3a and 3b, the sound recording device 4a and 4b, and the whiteboard 53, except the table 51 as shown in FIG. 13, are placed in the work area 71 as shown in FIG. 13. A description that follows assumes that the number of conference participants is two. The conference participants sit on chairs 52a and 52b, respectively. The photographing devices 2a and 2b in FIG. 24 respectively photograph areas corresponding to the projections 54a and 54b to conic planes corresponding to solid angles so that the gestures and posture of the conference participants can be captured.

Figure 24:
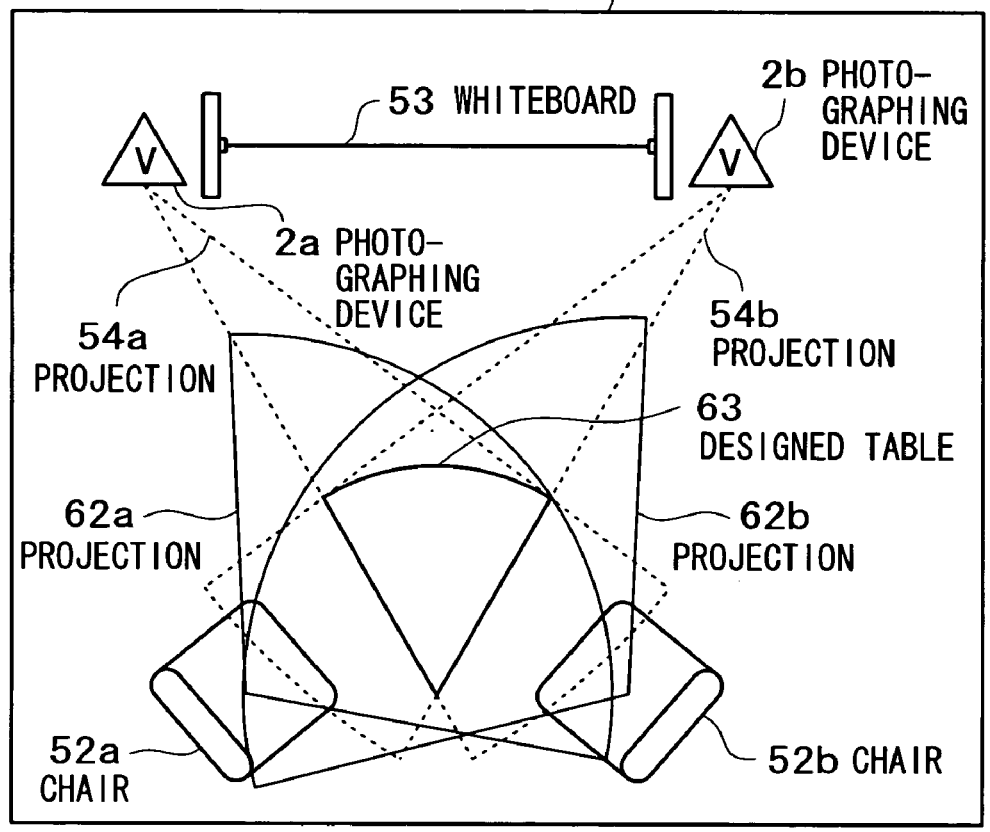
FIG. 24 is a drawing to explain a table design method.

FIG. 24 shows, in fan shapes, areas corresponding to projections 62a and 62b to conic planes corresponding to solid angles in the range in which the conference participants view other conference participants (counter parties) and the whiteboard 53. Here, the projections 62a and 62b to conic planes corresponding to solid angles in the range in which the conference participants view other conference participants (counter parties) and the whiteboard 53 can be set as the attribute of the conference participant icons 87a and 87b or the attribute icons in Step S64.

As the attributes of the conference participants, in addition to "view ranges of the conference participants", conference participant related information such as the positions of the conference participants, the postures of the conference participants, visible and audible ranges of the conference participants, and movable ranges of the conference participants can be set using the attribute icons. The view ranges of the conference participants set as described above can be considered to be the positions and directions of the heads of the conference participants. An area 63 in an upper part of the table can be designed to contain an overlap area of fan-shaped areas on a plane of the abovementioned projections 54a, 54b, 62a and 62b. The table can be set to contain the area 63 in the upper part of the table thus defined.

For the set table, the furniture icon 73 representative of a table can be presented to the user. As the shape of the table presented to the user, an optimum table shape may be selected from among one or more types of basic shapes of table. Basic shapes of tables are preferably triangle, quadrangle, or hexagon.

Figure 25:
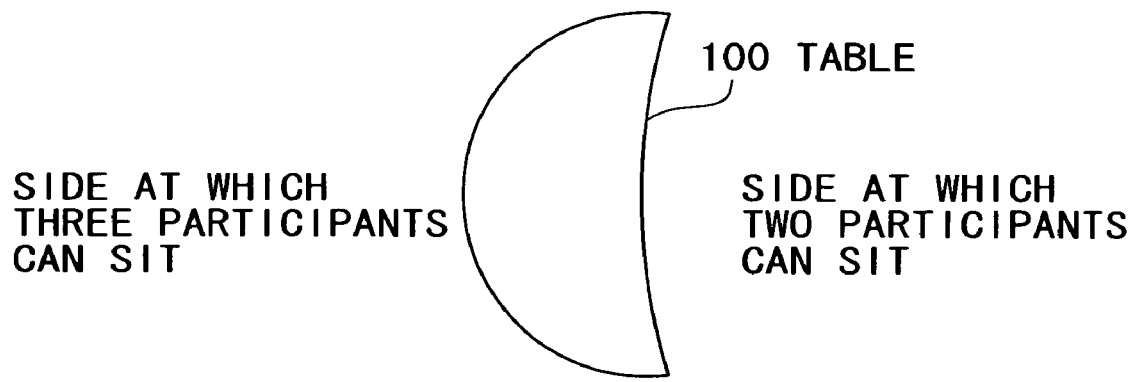
FIG. 25 is a drawing to explain a table design method.

On the other hand, for the furniture icon 73 representative of the set table, the user can set color, spectral distribution, reflection factor, permeability, and the like which are representative of the attributes of the table, using a menu, dialog, or the like. As the attribute of the furniture icon 73, the user can set information about afforddance of the furniture, using a menu, dialog, or the like. For example, consider a crescent table with a partial lack of a circle of 50 centimeters in radius as shown in FIG. 25. In this case, afforddance information can be set as table attribute information, to indicate that, on the circumferential side of the table, three participants can sit or the number of participants who can sit is implicitly decided depending on the table, while, on the lacking side of the table, two conference participants can sit, or the number of participants who can sit is implicitly decided depending on the table.

Furniture such as other chairs and the conference room can be designed by the same method as the abovementioned table setting method. When designing a conference room, the user can set size, shape, color or spectral distribution, reflection factor, and permeability of electromagnetic wave such as visible light or sound wave of the place in which a conference is held, as the attribute of the floor, wall, and ceiling of the conference room, by use of a specific graphical user interface such as a menu or dialog.

Figure 26:
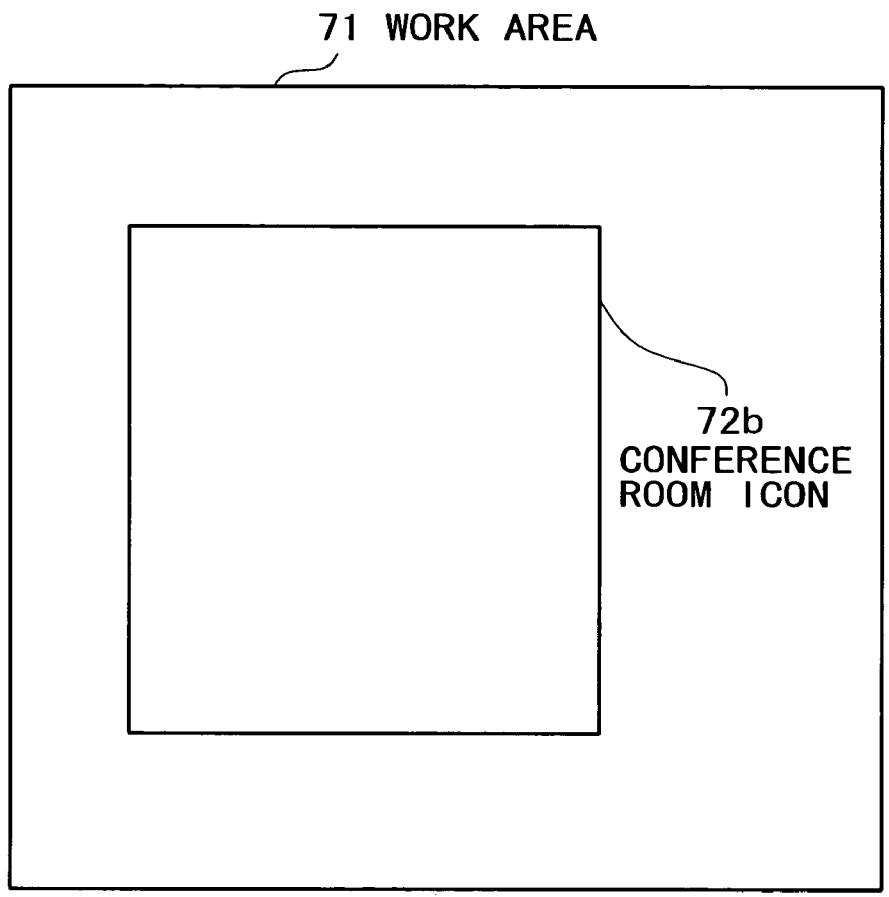
FIG. 26 is a drawing showing an operation screen of a conference room icon 72b in a work area 71 of a graphical user interface 86.
Figure 27:
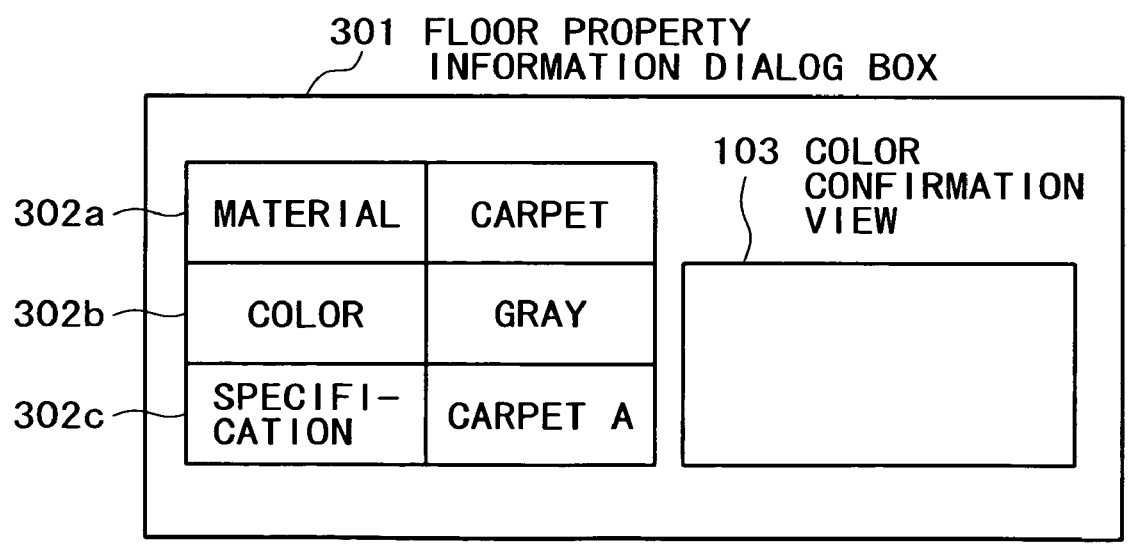
FIG. 27 is a drawing showing a floor property information dialog box 301.
Figure 28:
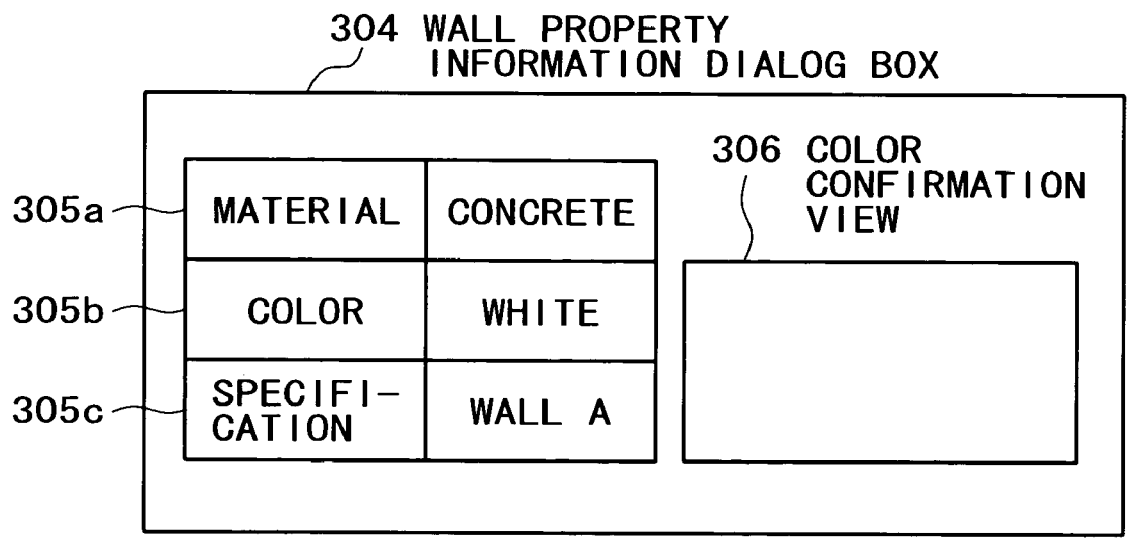
FIG. 28 is a drawing showing a wall property information dialog box 304.

The following describes the design of the conference room. FIG. 26 is a drawing showing an operation screen of the conference room icon 72b in the work area 71 of the graphical user interface 86. FIG. 27 is a drawing showing a floor property information dialog box 301. FIG. 28 is a drawing showing a wall property information dialog box 304. As described previously, in Step S41, the user drags and drops the conference room icon 72b in the work area 71.

The user can specify a conference room size by changing the size of the dragged and dropped conference room icon 72b. By dragging and dropping the conference room icon 72b in the work area 71, the floor property information dialog box 301 shown in FIG. 27 and the wall property information dialog box 304 shown in FIG. 28 are displayed in a predetermined area of the graphical user interface 86. The user can specify detailed information about the conference room by use of the floor property information dialog box 301 and the wall property information dialog box 304. The floor property information dialog box 301 is used to input detailed attribute information on the floor in the conference room.

As shown in FIG. 27, the floor property information dialog box 301 includes a material field 302a, a color field 302b, a specification field 302c, and a color confirmation view 303. FIG. 27 shows that "Carpet" is specified as the material of the floor, "Gray" is specified as the color of the floor, and "Carpet A" is specified as the specification of the floor. The color confirmation view 303 presents the color of the floor to the user. The floor color presented to the user by color confirmation view 303 can be set by performing a simulation using the ray tracing method or the like of computer graphics from the abovementioned lighting area information and the like.

The wall property information dialog box 304 is used to input detailed attribute information on the conference room wall. As shown in FIG. 28, the wall property information dialog box 304 includes a material field 305a, a color field 305b, a specification field 305c, and a color confirmation view 306. FIG. 28 shows that "Concrete" is specified as the material of the wall, "White" is specified as the color of the wall, and "Wall A" is specified as the specification of the wall.

The color confirmation view 306 presents the color of the wall to the user.

The wall color presented to the user by the color confirmation view 306 can be set by performing a simulation using the ray tracing method or the like of computer graphics from the abovementioned lighting area information and the like. Information about the conference room inputted from the graphical user interface 86 is stored in the storage part 217 from the environment information input part 216. When the user has performed proper operations as described above, the specified information is inputted to the each storage part.

The operation part 203 designs, under the control of the control part 202, the conference room of a design object, based on the photographing area information inputted from the storage part 207, the lighting area information inputted from the storage part 209, the sound recording area information inputted from the storage part 211, the conference participant related information inputted from the storage part 213, the furniture information inputted from the storage part 215, and the conference environment information inputted from the storage part 217, and other information. The data of the designed conference room of a design object is stored in the storage part 204. The display part 205 displays the design data inputted from storage part 204 to the user. In this way, the user can design the conference room by operating the conference room icon 72b in the work area 71 of the graphical user interface 86.

Figure 29:
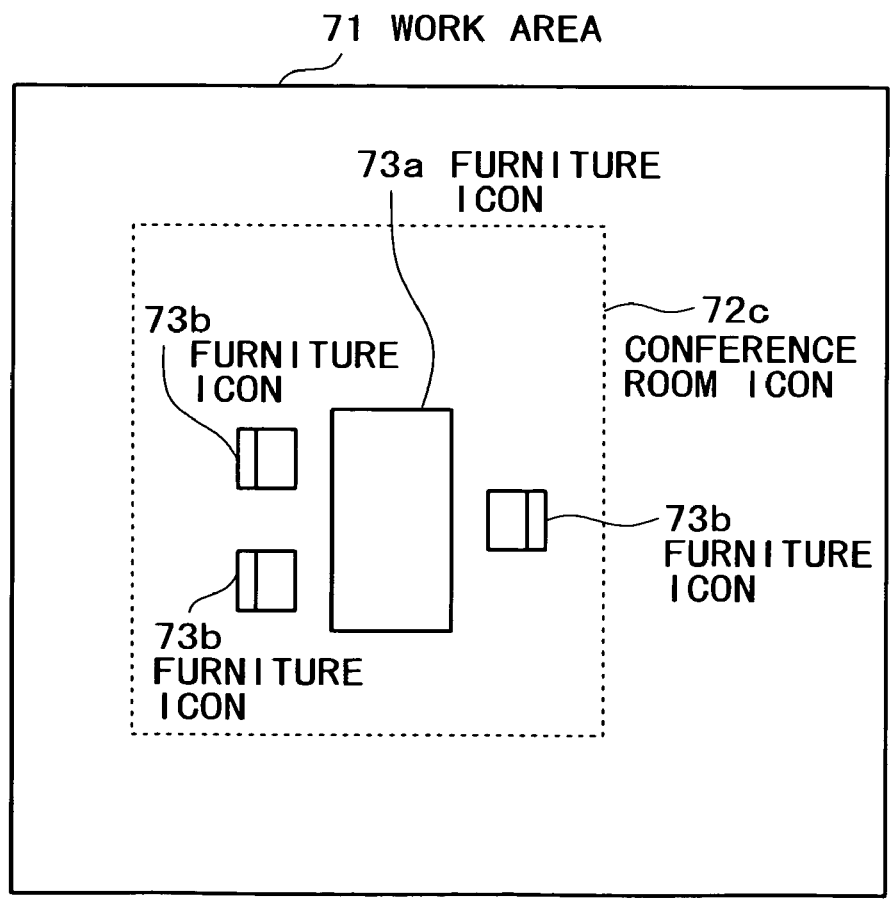
FIG. 29 is a drawing showing an operation screen of furniture icons 73a and 73b in a work area 71 of a graphical user interface 86.
Figure 30:
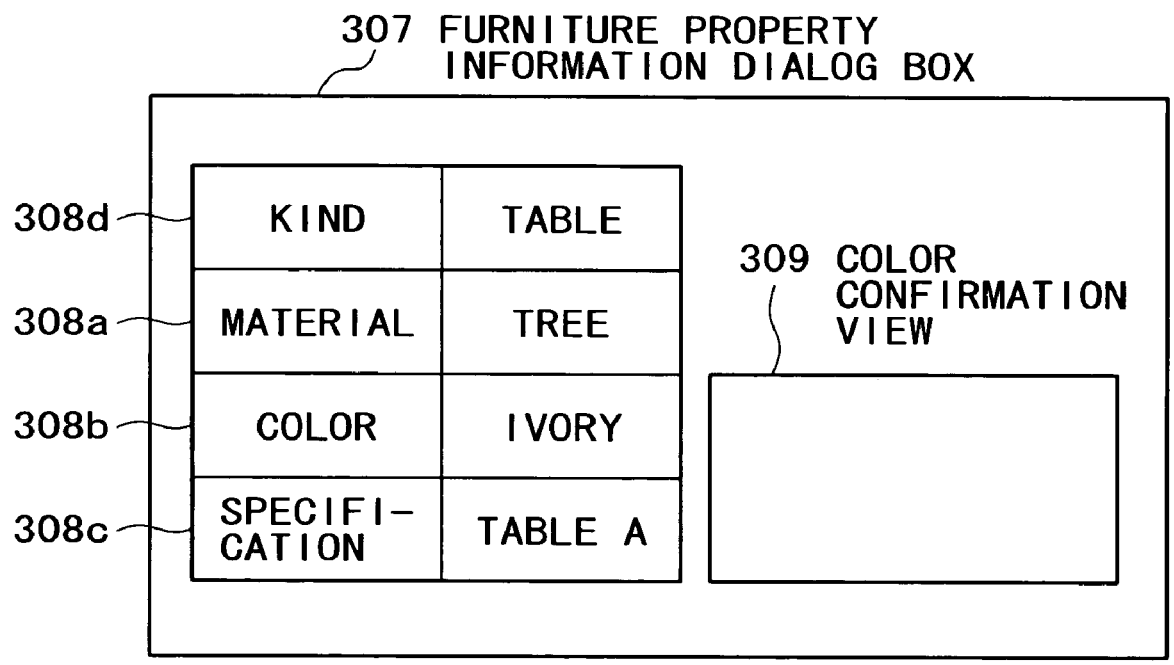
FIG. 30 is a drawing showing a furniture property information dialog box 307.
Figure 31:
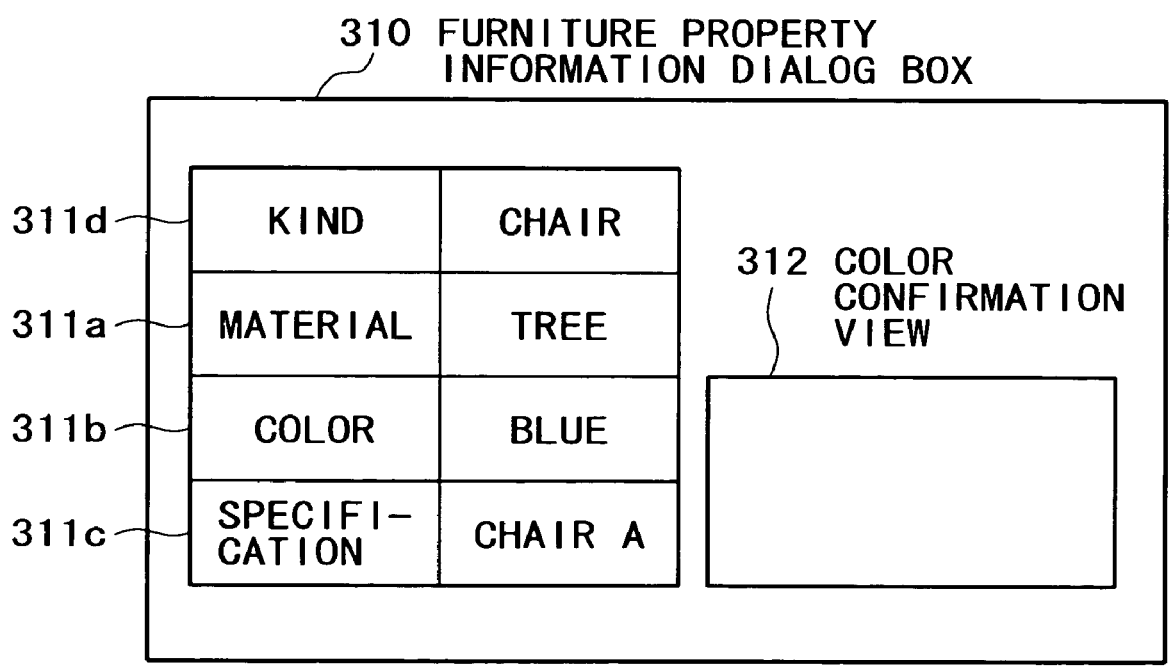
FIG. 31 is a drawing showing a furniture property information dialog box 308.

The table and chairs can be designed as follows. FIG. 29 is a drawing showing the operation screen of the furniture icons 73a and 73b in the work area 71 of the graphical user interface 86. FIG. 30 is a drawing showing a furniture property information dialog box 307. FIG. 31 is a drawing showing a furniture property information dialog box 308. By placing the furniture icon 73 in the work area 71 of the graphical user interface 86 by a drag-and-drop operation, the furniture property information dialog box 307 shown in FIG. 30 and the furniture property information dialog box 308 shown in FIG. 31 are displayed in the predetermined areas of the graphical user interface 86.

As described above, in Step S42, the user places the furniture icon in the work area 71 by a drag-and-drop operation. Thereby, as shown in FIG. 29, the furniture icons 73a and 73b are placed in the work area 71. The furniture icon 73a is an icon representative of a table. The furniture icons 73b are icons representative of a chair. The user can specify the position and the size of the table and the chairs by changing the position and the size of the furniture icons 73a and 73b. Next, the user specifies detailed information about the furniture using the furniture property information dialog box 307 or 308.

As shown in FIG. 30, the furniture property dialog box 307 includes a material field 308a, a color field 308b, a specification field 308c, a kind field 308d, and a color confirmation view 309. FIG. 30 shows that "Table" is specified as the kind of the furniture, "Tree" is specified as the material of the furniture, "Ivory" is specified as the color of the furniture, and "Table A" is specified as the specification of the furniture. The color confirmation view 309 presents the color of the furniture to the user. Like the wall and the floor of the conference room, the color presented in the color confirmation view 309 can be set by performing a simulation using the ray tracing method or the like of computer graphics from the lighting area information and the like. Other attribute information about furniture such as a reflection factor can also be specified using the furniture property information dialog box 307.

As shown in FIG. 31, the furniture property dialog box 308 includes a material field 311a, a color field 311b, a specification field 311c, a kind field 311d, and a color confirmation view 312. FIG. 31 shows that "Chair" is specified as the kind of furniture, "Tree" is specified as the material of the furniture, "Blue" is specified as the color of the furniture, and "Chair A" is specified as the specification of the furniture. The color confirmation view 312 presents the color of the furniture to the user. Like the wall and the floor of the conference room, the color presented in color confirmation view 312 can be set by performing a simulation using the ray tracing method or the like of computer graphics from the lighting area information and the like. Other attribute information about furniture such as a reflection factor can also be specified using the furniture property information dialog box 308.

The furniture information inputted from the graphical user interface 86 is stored in the storage part 215 from the furniture information input part 214. The specified information is inputted to each of the storage parts by the abovementioned user's operations. The operation part 203 designs, under the control of the control part 202, furniture including a table and chairs, which are design objects, based on the photographing area information inputted from storage part 207, the lighting area information inputted from the storage part 209, the sound recording area information inputted from the storage part 211, the conference participant related information inputted from the storage part 213, the furniture information inputted from the storage part 215, and the conference environment information inputted from the storage part 217 and the like. The data of the designed design objects is stored in the storage part 204. The display part 205 displays the design data inputted from the storage part 204 to the user. Thus, the user can design the furniture including the table and the chairs by operating the furniture icons 73a and 73b and the like in the work area 71 of the graphical user interface 86.

Figure 32:
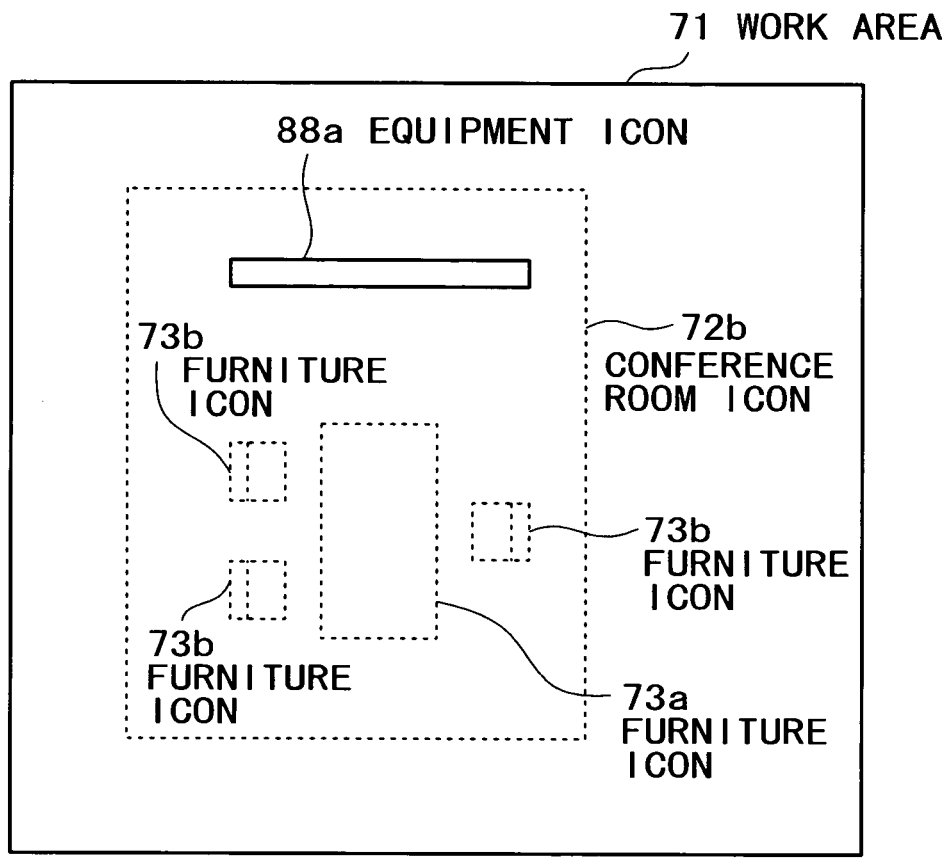
FIG. 32 is a drawing showing an operation screen of an equipment icon 88a in a work area 71 of a graphical user interface 86.

An equipment such as a whiteboard can be designed as follows. FIG. 32 is a drawing showing an operation screen of the equipment icon 88a in the work area 71 of the graphical user interface 86. As described above, in step S47, the user places the equipment icon 88 in the work area 71 by a drag-and-drop operation. Thereby, the equipment icon 88a is displayed in the work area 71. The user can specify the position and the size of the equipment by changing the position and the size of the dragged and dropped equipment icon 88a. By placing the equipment icon 88a in the work area 71 by a drag-and drop operation, an equipment property information dialog box 313 is displayed in a predetermined area of the graphical user interface 86.

Figure 33:
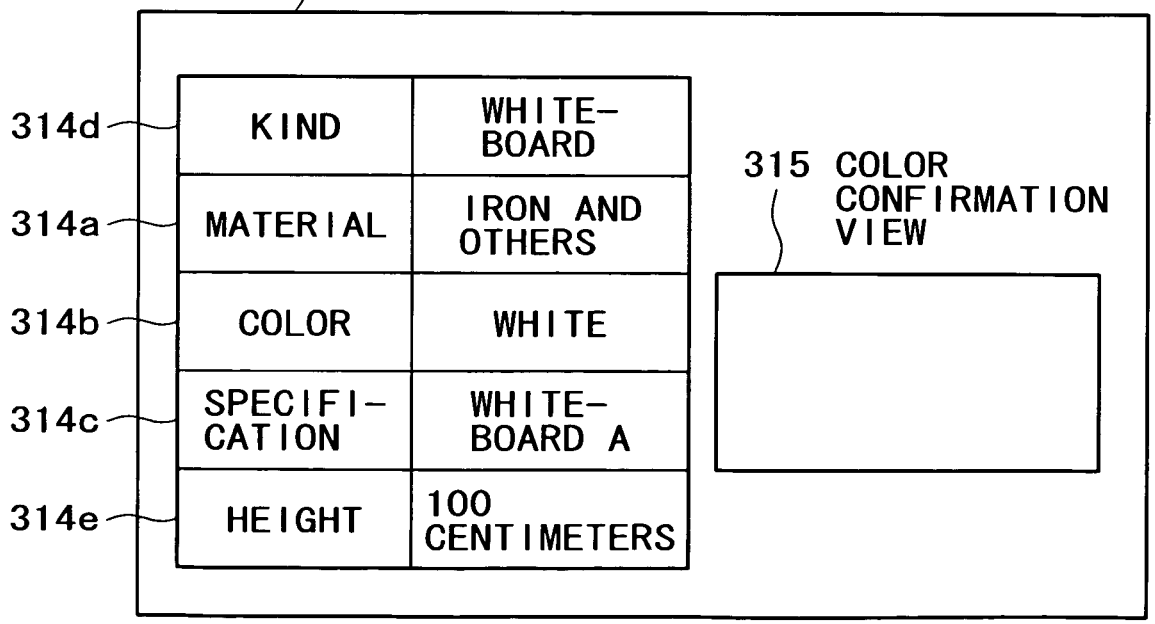
FIG. 33 is a drawing showing an equipment property information dialog box 313.

FIG. 33 is a drawing showing the equipment property information dialog box 313. The user can specify detailed information about the equipment using the equipment property information dialog box 313. The equipment property information dialog box 313 is used to input detailed attribute information about the equipment. As shown in FIG. 33, the equipment property information dialog box 313 includes a material field 314a, a color field 314b, a specification field 314c, a kind field 314d, a height field 314e, and a color confirmation view 315.

FIG. 33 shows that "Whiteboard" is specified as the kind of the equipment, "Iron and others" is specified as the material of the equipment, "White" is specified as the color of the equipment, "Whiteboard A" is specified as the specification of the equipment, and "100 centimeters" is specified as the height of the equipment. The color confirmation view 315 presents the color of the equipment to the user. The equipment color presented to the user in the color confirmation view 315 can be set by performing a simulation using the ray tracing method or the like of computer graphics from the abovementioned lighting area information and the like.

The equipment information inputted from the graphical user interface 86 is stored in the storage part 217 from the environment information input part 216. The specified information is inputted in each of the storage parts by the abovementioned user's operations. The operation part 203 designs, under the control of the control part 202, the whiteboard, which is a design object, based on the photographing area information inputted from the storage part 207, the lighting area information inputted from the storage part 209, the sound recording area information inputted from the storage part 211, the conference participant related information inputted from the storage part 213, the furniture information inputted from the storage part 215, and the conference environment information inputted from the storage part 217 and the like. The data of the designed design object is stored in the storage part 204. The display part 205 displays the design data inputted from the storage part 204 to the user. Thus, The user can design the whiteboard by operating the equipment icon 88a and the like in the work area 71 of the graphical user interface 86.

A conference recording device, a conference recording method, a design device, or a design method is achieved by use of a CPU, a ROM (Read Only Memory), a RAM (Random Access Memory), and the like, for example. A program is installed from a portable storage medium such as a hard disk drive, a CD-ROM, a DVD, or a flexible disk, or downloaded over communication lines. The CPU executes this program and thereby each step is executed. Steps described below are executed by the CPU.

A conference recording program includes the following steps executed by the CPU: a generating step that generates photographing area information representative of a photographing area of each of plural photographing units so that the plural photographing units cooperatively photograph a photographing object; a generating step that generates lighting area information representative of a lighting area of each of plural lighting units so that the plural lighting units cooperatively light a photographing object; a generating step that generates sound recording area information representative of a sound recording area of each of plural sound recording units so that the plural sound recording units cooperatively record sound information; and a control step that controls the photographing area of each of the photographing units, the lighting area of each of the lighting units, and the sound recording area of each of the sound recording units by use of the photographing area information, the lighting area information, and the sound recording area information that are generated in the each generating step. Thereby, plural less redundant videos can be obtained.

A design program includes the following steps executed by the CPU: setting conference room information according to a conference room icon dragged and dropped in a work area within a graphical user interface; setting furniture information according to a furniture icon dragged and dropped in the work area; setting photographing device information according to a photographing device icon dragged and dropped in the work area; setting conference participants' information according to a conference participant icon dragged and dropped in the work area; setting participants' attribute information according to an operation of a proper attribute icon; designing a design object according to the set information; and displaying the design object designed in the design step. Thereby, a design object can be designed and displayed according to set information.

The photographing devices 2, the generating parts 11, 27, and 40, the control parts 5, 24, and 34, the lighting devices 3, the sound recording devices 4, the communication parts 13, 14, 15, 29, 30, 31, 42, 43, and 44, the driving parts 18, 21, and 45 correspond to the photographing unit, the generating unit, the control unit, the lighting unit, the sound recording unit, the communication unit, the driving unit described in the patent claims, respectively.

Hereinbefore, embodiments of the present invention have been described in detail. The present invention is not limited to such specific embodiments and may be modified and changed in various ways within the spirit and scope of the present invention described in the patent claims. As described above, an embodiment of the present invention is a conference recording device including: plural photographing units; a generating unit that generates photographing area information representative of a photographing area of each of the photographing units so that each of the photographing units cooperatively photographs a photographing object; and a control unit that controls the photographing area of each of the photographing units by use of the photographing area information generated by the generating unit. The photographing unit photographs a picture and/or records a video of the photographing object. Therefore, the photographing object is not limited to a still image and may include a moving image. According to this embodiment of the invention, the conference recording device generates photographing area information representative of a photographing area of each photographing unit so that each photographing unit cooperatively photographs a photographing object, and the photographing area of each of the photographing units is controlled using the photographing area information. Therefore, plural less redundant videos can be obtained.

Another embodiment of the present invention is a conference recording device including: plural lighting units; a generating unit that generates lighting area information representative of a lighting area of each of the lighting units so that each of the lighting units cooperatively lights a photographing object; and a control unit that controls the lighting area of each of the lighting units by use of the lighting area information generated by the generating unit. According to this embodiment of the invention, the conference recording device generates lighting area information representative of a lighting area of each lighting unit so that each lighting unit cooperatively lights a photographing object, and the lighting area of the each lighting unit is controlled using the lighting area information. Therefore, plural less redundant lightings can be achieved.

Another embodiment of the present invention is a conference recording device including: plural sound recording units; a generating unit that generates sound recording area information representative of a sound recording area of each of the sound recording units so that each of the sound recording units cooperatively records sound; and a control unit that controls the sound recording area of each of the sound recording units by use of the sound recording area information generated by the generating unit. According to this embodiment of the invention, the conference recording device generates sound recording area information representative of a sound recording area of each sound recording unit so that each sound recording unit cooperatively records sound information, and the sound recording area of each of the sound recording units is controlled using the sound recording area information. Therefore, plural less redundant pieces of sound information can be recorded.

The conference recording device described above may further include plural lighting units. Here, the generating unit may generate lighting area information representative of a lighting area of each of the lighting units so that each of the lighting units cooperatively lights a photographing object, and the control unit may control the lighting area of each of the lighting units by use of the lighting area information generated by the generating unit. According to this embodiment of the invention, the conference recording device generates lighting area information representative of a lighting area of each of the lighting units so that each of the lighting units cooperatively lights a photographing object, and the lighting area of each of the lighting units is controlled using the lighting area information. Therefore, plural less redundant lightings can be achieved.

The conference recording device described above may further include plural sound recording units. Here, the generating unit may generate sound recording area information representative of a sound recording area of each of the sound recording units so that each of the sound recording units cooperatively records sound information, and the control unit may control the sound recording area of each of the sound recording units by use of the sound recording area information. According to this embodiment of the invention, the conference recording device generates sound recording area information representative of a sound recording area of each of the sound recording units so that each of the sound recording units cooperatively records sound information, and the sound recording area of each of the sound recording units is controlled using the sound recording area information. Therefore, plural less redundant pieces of sound information can be recorded.

The generating unit may generate the photographing area information, the lighting area information, and the sound recording area information so as to exclusively control each of the photographing units, each of the lighting units, and each of the sound recording units in terms of time, respectively. According to this embodiment of the invention described above, time-based exclusive control is enabled. Thereby, the whole system can be easily controlled, and time-based exclusive control is enabled by fixing other than under control.

In the conference recording device described above, the generating unit may generate the photographing area information so that each of the photographing units photographs a different space on a three-dimensional space. According to this embodiment of the invention, since the generating unit generates photographing area information so that each of the photographing units photographs a different space on a three-dimensional space, each of the photographing units can be spatially exclusively controlled. As a result, plural less redundant videos can be obtained.

In the conference recording device described above, the generating unit may generate the lighting area information so that each of the lighting units lights a different space on a three-dimensional space. According to this embodiment of the invention, since the generating unit generates lighting area information so that each of the lighting units lights a different space on a three-dimensional space, each of the lighting units can be spatially exclusively controlled. As a result, plural less redundant lightings can be achieved.

In the conference recording device described above, the generating unit may generate the sound recording area information so that each of the sound recording units records sound information generated on a different space on a three-dimensional space. According to this embodiment of the invention, since the generating unit generates sound recording area information so that each of the sound recording units records sound information generated on a different space on a three-dimensional space, each of the sound recording units can be spatially exclusively controlled. As a result, plural less redundant sound recordings can be achieved.

In the conference recording device described above, the generating unit may generate the photographing area information, the each lighting area information, or the sound recording area information by use of an evaluation function including a function to represent redundancy. According to this embodiment of the invention, redundancy in contents can be reduced so that photographing areas, lighting areas, and sound recording areas do not overlap.

In the conference recording device described above, the generating unit may generate the photographing area information, the each lighting area information, or the sound recording area information by use of a video photographed by each of the photographing units. According to this embodiment of the invention, photographing area information, lighting area information, or sound area information can be generated taking circumstances in a conference room into account, by use of a video photographed by each of the photographing units.

In the conference recording device described above, the generating unit may generate the photographing area information, the lighting area information, or the sound recording area information, based on an area where figures in a video photographed by the photographing unit exist. According to this embodiment of the invention, spatial exclusive control can be performed taking figures' existence into account. Thereby, a less redundant video is obtained.

In the conference recording device described above, the generating unit may detect mutual gaze of the figures in the video photographed by the photographing unit or the gaze of the figures into a whiteboard, and uses a detection result to generate the photographing area information, the lighting area information, or the sound recording area information. According to this embodiment of the invention, a video containing mutual gaze between figures or the gaze of the figures into a whiteboard can be obtained.

In the conference recording device described above, the generating unit may use the sound information recorded by each of the sound recording units to generate the photographing area information, the lighting area information, or the sound recording area information. According to this embodiment of the invention described, photographing area information and lighting sound recording area information can be generated taking sound information recorded by the sound recording unit into account.

In the conference recording device described above, the generating unit may generate the photographing area information, the lighting area information, or the sound recording area information from a sound source position estimated by use of the sound information recorded by the sound recording unit. According to this embodiment of the invention, pieces figure's existence can be detected from a sound source position, and spatial exclusive control can be performed taking the figure's existence into account. Thereby, a less redundant video is obtained.

In the conference recording device described above, the generating unit may detect a discussion or soliloquy from the sound information recorded by each of the sound recording units by use of voice recognition technology, and according to a detection result, generate the photographing area information, the lighting area information, or the sound recording area information. According to this embodiment of the invention, a video containing discussions or soliloquies can be obtained.

In the conference recording device described above, the generating unit may generate the photographing area information, the lighting area information, or the sound recording area information by use of at least one of positions of conference participants, postures of the conference participants, positions and directions of heads of the conference participants, visible and audible ranges of the conference participants, and movable ranges of the conference participants. According to this embodiment of the invention, appropriate photographing area information, lighting area information, or sound recording area information can be generated taking the conditions of the participants into account.

In the conference recording device described above, the generating unit may generate the photographing area information, the lighting area information, or the sound recording area information by use of position information of each of the photographing units, position information of the lighting unit, or position information of the sound recording unit. According to this embodiment of the invention, appropriate photographing area information, lighting area information, or sound recording area information can be generated taking into account position information of each of the photographing units, position information of the lighting unit, or position information of the sound recording unit.

In the conference recording device described in above, the generating unit may use the photographing area information, the lighting area information, and the sound recording area information at a first point to generate the photographing area information, the lighting area information, or the sound recording area information at a second point next to the first point. According to this embodiment of the invention, the photographing area information, the lighting area information, or the sound area information at the second point is decided by the photographing area information, the lighting area information, or the sound area information at the first point.

In the conference recording device described above, the generating unit may generate the photographing area information, the lighting area information, or the sound recording area information by use of information about furniture placed in a given conference room. According to this embodiment of the invention, appropriate photographing area information, lighting area information, and sound recording area information can be generated taking the furniture placed in the conference room into account.

In the conference recording device described above, the information about furniture placed in the conference room may include a table and a whiteboard shared by the conference participants, or positions, directions, sizes, shapes, or colors of chairs used by the conference participants.

In the conference recording device described above, the photographing area information, the lighting area information, or the sound recording area information may include at least one of an identifier, coordinates, an angle formed with a normal, an azimuth, a solid angle, specification, and a distance to an object of each of the photographing units, each of the lighting units, or each of the sound recording units.

In the conference recording device described above, the generating unit may generate the lighting area information according to illumination or luminance in the conference room. According to this embodiment of the invention, each of the lighting units can be controlled according to illumination or luminance in the conference room.

In the conference recording device described in above, the control unit may be provided for each of the photographing units, each of the lighting units, and each of the sound recording devices, respectively.

In the conference recording device described above, the generating unit may be provided for each of the photographing units, each of the lighting units, and each of the sound recording devices, respectively.

In the conference recording device described above, the conference recording device further may include a communication unit that transmits and receives the photographing area information, lighting area information, or sound recording area information generated by each of the generating units to and from other generating units. According to this embodiment of the invention, photographing area information, lighting area information, or sound recording area information generated by each of the generating units can be transmitted to and received from other generating units by the communication unit.

In the conference recording device described above, the conference recording device may further include a driving unit that drives each of the photographing units, each of the lighting units, or each of the sound recording units. According to this embodiment of the invention, each of the photographing units, each of the lighting units, or each of the sound recording units can be moved.

In the conference recording device described above, the conference recording device may further include a unit that displays a graphical user interface that controls each of the photographing units, each of the lighting units, or each of the sound recording units. According to this embodiment of the invention, each of the photographing units, each of the lighting units, or each of the sound recording units can be controlled using the graphical user interface.

In the conference recording device described above, the graphical user interface may include at least one of an icon to set the conference room, an icon to set the furniture, an icon to set the photographing unit, an icon to set the lighting unit, an icon to set the sound recording unit, a work area in which these icons are dragged and dropped for operations, an icon to set the photographing area by the photographing unit, an icon to set the lighting area by the lighting unit, and an icon to set the sound recording area by the sound recording unit. According to this embodiment of the invention, the conference recording device can be controlled using the icons in the graphical user interface. Thereby, plural less redundant videos are obtained.

In the conference recording device described above, the work area may represent the icons on a two-dimensional or three-dimensional space.

Another embodiment of the present invention is a conference recording method including: generating photographing area information representative of a photographing area of each of plural photographing units so that the plural photographing units cooperatively photograph a photographing object; generating lighting area information representative of a lighting area of each of plural lighting units so that the plural lighting units cooperatively light a photographing object; generating sound recording area information representative of a sound recording area of each of plural sound recording units so that the plural sound recording units cooperatively record sound information; and controlling the photographing area of each of the photographing units, the lighting area of each of the lighting units, and the sound recording area of each of the sound recording units by use of the photographing area information, the lighting area information, and the sound recording area information that are generated in each of the generating steps. According to this embodiment of the invention, plural less redundant videos can be obtained.

Another embodiment of the present invention is a storage medium readable by a computer, the storage medium storing a program executed by the computer, the program including: a generating step that generates photographing area information representative of a photographing area of each of plural photographing units so that the plural photographing units cooperatively photograph a photographing object; a generating step that generates lighting area information representative of a lighting area of each of plural lighting units so that the plural lighting units cooperatively light a photographing object; a generating step that generates sound recording area information representative of a sound recording area of each of plural sound recording units so that the plural sound recording units cooperatively record sound information; and a control step that controls the photographing area of each of the photographing units, the lighting area of each of the lighting units, and the sound recording area of each of the sound recording units by use of the photographing area information, the lighting area information, and the sound recording area information that are generated in each of the generating steps. According to this embodiment of the invention, plural less redundant videos can be obtained.

Another embodiment of the present invention is a design method including: setting conference room information according to a conference room icon dragged and dropped in a work area within a graphical user interface; setting furniture information according to a furniture icon dragged and dropped in the work area; setting photographing device information according to a photographing device icon dragged and dropped in the work area; setting conference participants' information according to a conference participant icon dragged and dropped in the work area; setting participants' attribute information according to an operation of a proper attribute icon; designing a design object according to the set information; and displaying the design object designed in the design step. According to this embodiment of the invention, a design object can be designed and displayed according to set information.

The design method described above may further include setting lighting device information according to a lighting device icon dragged and dropped in the work area; setting sound recording device information according to a sound recording device icon dragged and dropped in the work area; and setting equipment information according to an equipment icon dragged and dropped in the work area. According to this embodiment of the invention, a design object can be designed taking lighting devices, sound devices, and equipments into account.

The design method described above may further include setting at least one of positions of conference participants, view ranges of the conference participants, postures of the conference participants, visible and audible ranges of the conference participants, and movable ranges of the conference participants according to an operation of a proper attribute icon. According to this embodiment of the invention, a design object can be designed taking into account the positions of conference participants, view ranges of the conference participants, the postures of the conference participants, visible and audible ranges of the conference participants, and movable ranges of the conference participants.

In the design method described above, the setting of conference room information may set a conference room size, a shape, a color, a spectral distribution, and a reflection factor or permeability. According to this embodiment of the invention, the design object can be designed taking the size, shape, and color of conference room or furniture, spectral distribution, and reflection factor or permeability into account.

In the design method described above, the setting of furniture information may set a furniture size, a shape, and a color, a spectral distribution, and a reflection factor or permeability. According to this embodiment of the invention, the design object can be designed taking the furniture size, shape, and color, spectral distribution, and reflection factor or permeability into account.

In the design method described above, the design object may be furniture including a conference room, a whiteboard, a table or chairs. According to this embodiment of the invention, furniture including, e.g., the conference room, whiteboard, or table or chair can be designed.

Another embodiment of the present invention is a storage medium readable by a computer, the storage medium storing a program executed by the computer, the program including the steps of: setting conference room information according to a conference room icon dragged and dropped in a work area in a graphical user interface; setting furniture information according to a furniture icon dragged and dropped in the work area; setting photographing device information according to a photographing device icon dragged and dropped in the work area; setting conference participants' information according to a conference participant icon dragged and dropped in the work area; setting participants' attribute information according to an operation of a proper attribute icon; and designing a design object according to the set information. According to this embodiment of the invention, a design object can be designed and displayed according to set information.

According to an embodiment of the present invention, a conference recording device, conference recording method, and design method and program that can capture less redundant conference information can be provided.

The entire disclosure of Japanese Patent Application No. 2004-139441 filed on May 10, 2004 including specification, claims, drawings and abstract is incorporated herein by reference in its entirety.

What is claimed is:

1. A conference recording device comprising:
   a plurality of photographing units that photograph a picture and/or record a video of conference information;
   a generating unit that generates photographing area information representative of a photographing area of each of the photographing units so that each of the photographing units cooperatively photographs a photographing object; and
   a control unit that controls the photographing area of each of the photographing units based on the photographing area information generated by the generating unit.

2. The conference recording device according to claim 1, further comprising a plurality of lighting units,
   wherein the generating unit generates lighting area information representative of a lighting area of each of the lighting units so that each of the lighting units cooperatively lights a photographing object, and
   the control unit controls the lighting area of each of the lighting units based on the lighting area information generated by the generating unit.

3. The conference recording device according to claim 2, further comprising a plurality of sound recording units,
   wherein the generating unit generates sound recording area information representative of a sound recording area of each of the sound recording units so that each of the sound recording units cooperatively records sound information, and
   the control unit controls the sound recording area of each of the sound recording units based on the sound recording area information.

4. The conference recording device according to claim 2, wherein the generating unit generates the photographing area information, the lighting area information, and the sound recording area information to exclusively control each of the photographing units, each of the lighting units, and each of the sound recording units in terms of time, respectively.

5. The conference recording device according to claim 3, wherein the generating unit generates the photographing area information, the lighting area information, or the sound recording area information by use of an evaluation function including a function to represent redundancy.

6. The conference recording device according to claim 3, wherein the generating unit generates the photographing area information, the lighting area information, or the sound recording area information based on a video photographed by each of the photographing units.

7. The conference recording device according to claim 6, wherein the generating unit generates the photographing area information, the lighting area information, or the sound recording area information, based on an area where a figure in the video exists.

8. The conference recording device according to claim 6, wherein the generating unit detects a situation of mutual gaze of a plurality of figures in the video or the gaze of a figure into a whiteboard, and generates the photographing area information, the lighting area information, or the sound recording area information based on the situation detected by the generating unit.

9. The conference recording device according to claim 3, wherein the generating unit generates the photographing area information, the lighting area information, or the sound recording area information based on the sound information recorded by each of the sound recording units.

10. The conference recording device according to claim 9, wherein the generating unit generates the photographing area information, the lighting area information, or the sound recording area information based on a sound source position estimated by the sound information recorded by the sound recording unit.

11. The conference recording device according to claim 9, wherein the generating unit detects a situation of a discussion or soliloquy from the sound information based on voice recognition technology, and, generates the photographing area information, the lighting area information, or the sound recording area information.

12. The conference recording device according to claim 3, wherein the generating unit generates the photographing area information, the lighting area information, or the sound recording area information based on at least one of a position of a conference participant, a posture of the conference participant, a position and a direction of head of the conference participant, visible and audible range of the conference participant, and movable range of the conference participant.

13. The conference recording device according to claim 3, wherein the generating unit generates the photographing area information, the lighting area information, or the sound recording area information based on position information of each of the photographing units, position information of the lighting units, or position information of the sound recording units.

14. The conference recording device according to claim 3, wherein the generating unit uses the photographing area information, the lighting area information, and the sound recording area information at a first point to generate the photographing area information, the lighting area information, or the sound recording area information at a second point next to the first point.

15. The conference recording device according to claim 3, wherein the generating unit generates the photographing area information, the lighting area information, or the sound recording area information based on information about furniture placed in a conference room.

16. The conference recording device according to claim 15, wherein the information about furniture includes at least one of a table, a whiteboard, a chair and a desk, and also, a position, a direction, a size, a shape, and a color of them.

17. The conference recording device according to claim 3, wherein the photographing area information, the lighting area information, or the sound recording area information include at least one of an identifier, a coordinate, an angle formed with a normal, an azimuth, a solid angle, a specification, and a distance to an object of each of the photographing units, each of the lighting units, or each of the sound recording units.

18. The conference recording device according to claim 3, wherein the control unit is provided for each of the photographing units, each of the lighting units, and each of the sound recording devices, respectively.

19. The conference recording device according to claim 3, wherein the generating unit is provided for each of the photographing units, each of the lighting units, and each of the sound recording devices, respectively.

20. The conference recording device according to claim 19, wherein the conference recording device further comprises a communication unit that transmits and receives the photographing area information, the lighting area information, and the sound recording area information generated by each of the generating units to and from other generating units.

21. The conference recording device according to claim 3, wherein the conference recording device further comprises a driving unit that drives each of the photographing units, each of the lighting units, or each of the sound recording units.

22. The conference recording device according to claim 3, wherein the conference recording device further comprises a unit that displays a graphical user interface that controls each of the photographing units, each of the lighting units, or each of the sound recording units.

23. The conference recording device according to claim 22, wherein the graphical user interface includes at least one of an icon to set the conference room, an icon to set the furniture, an icon to set the photographing unit, an icon to set the lighting unit, an icon to set the sound recording unit, a work area in which these icons are dragged and dropped for a operation, an icon to set the photographing area by the photographing unit, an icon to set the lighting area by the lighting unit, and an icon to set the sound recording area by the sound recording unit.

24. The conference recording device according to claim 23, wherein the work area represents each of the icons on a two-dimensional or three-dimensional space.

25. The conference recording device according to claim 1, wherein the generating unit generates the photographing area information so that each of the photographing units photographs a different space on a three-dimensional space.

26. A conference recording device comprising:
a plurality of lighting units;
a generating unit that generates lighting area information representative of a lighting area of each of the lighting units so that each of the lighting units cooperatively lights a photographing object; and
a control unit that controls the lighting area of each of the lighting units based on the lighting area information generated by the generating unit.

27. The conference recording device according to claim 26, wherein the generating unit generates the lighting area information so that each of the lighting units lights a different space on a three-dimensional space.

28. The conference recording device according to claim 26, wherein the generating unit generates the lighting area information according to illumination or luminance in the conference room.

29. A conference recording device comprising:
a plurality of sound recording units;
a generating unit that generates sound recording area information representative of a sound recording area of each of the sound recording units so that each of the sound recording units cooperatively records sound information; and
a control unit that controls the sound recording area of each of the sound recording units based on the sound recording area information generated by the generating unit.

30. The conference recording device according to claim 29, wherein the generating unit generates the sound recording area information so that each of the sound recording units records sound information generated on a different space on a three-dimensional space.

31. A conference recording method comprising:
generating photographing area information representative of a photographing area of each of a plurality of photographing units so that the plurality of photographing units cooperatively photograph a photographing object;
generating lighting area information representative of a lighting area of each of a plurality of lighting units so that the plurality of lighting units cooperatively light a photographing object;
generating sound recording area information representative of a sound recording area of each of a plurality of sound recording units so that the plurality of sound recording units cooperatively record sound information; and
controlling the photographing area of each of the photographing units, the lighting area of each of the lighting units, and the sound recording area of each of the sound recording units based on the photographing area information, the lighting area information, and the sound recording area information wherein the photographing unit photographs the photographing object by photographing a picture and/or recording a video.

32. A storage medium readable by a computer, the storage medium storing a program executed by the computer, the program comprising:
generating photographing area information representative of a photographing area of each of a plurality of photographing units so that the plurality of photographing units cooperatively photograph a photographing object;
generating lighting area information representative of a lighting area of each of a plurality of lighting units so that the plurality of lighting units cooperatively light a photographing object;
generating sound recording area information representative of a sound recording area of each of a plurality of sound recording units so that the plurality of sound recording units cooperatively record sound information; and
controlling the photographing area of each of the photographing units, the lighting area of each of the lighting units, and the sound recording area of each of the sound recording units based on the photographing area information, the lighting area information, and the sound recording area information wherein the photographing unit photographs the photographing object by photographing a picture and/or recording a video.

33. A design method comprising:
setting conference room information according to a conference room icon dragged and dropped in a work area within a graphical user interface;
setting furniture information according to a furniture icon dragged and dropped in the work area;
setting photographing device information according to a photographing device icon dragged and dropped in the work area;
setting conference participant's information according to a conference participant icon dragged and dropped in the work area;
setting participant's attribute information according to an operation of a proper attribute icon;
designing a design object according to the set information; and
displaying the design object.

34. The design method according to claim 33, further comprising:
setting lighting device information according to a lighting device icon dragged and dropped in the work area;
setting sound recording device information according to a sound recording device icon dragged and dropped in the work area; and
setting equipment information according to an equipment icon dragged and dropped in the work area.

35. The design method according to claim 33, further comprising, setting at least one of a position of conference participant, view range of the conference participant, posture of the conference participant, visible and audible range of the conference participant, and movable range of the conference participant according to an operation of a proper attribute icon.

36. The design method according to claim 33,
wherein the setting conference room information sets a conference room size, a shape, a color, a spectral distribution, and a reflection factor or permeability.

37. The design method according to claim 33,
wherein the setting furniture information sets at least one of a furniture size, a shape, and a color, a spectral distribution, and a reflection factor and permeability.

38. The design method according to claim 33,
wherein the design object is furniture including at least one of a conference room, a whiteboard, a table and a chair.

39. A storage medium readable by a computer, the storage medium storing a program executed by the computer, the program comprising:
setting conference room information according to a conference room icon dragged and dropped in a work area in a graphical user interface;
setting furniture information according to a furniture icon dragged and dropped in the work area;

setting photographing device information according to a photographing device icon dragged and dropped in the work area;

setting conference participant's information according to a conference participant icon dragged and dropped in the work area;

setting participant's attribute information according to an operation of a proper attribute icon; and designing a design object according to the set information.

* * * * *